United States Patent [19]

Kawai

[11] Patent Number: 5,099,293
[45] Date of Patent: Mar. 24, 1992

[54] IMAGE PROCESSING APPARATUS OPERABLE ANALOGUE AND DIGITAL COPYING MODES

[75] Inventor: Yoshihisa Kawai, Osaka, Japan

[73] Assignee: Minolta Camera Kabushiki Kaisha, Osaka, Japan

[21] Appl. No.: 446,438

[22] Filed: Dec. 5, 1989

[30] Foreign Application Priority Data

| Dec. 6, 1988 | [JP] | Japan | 63-308121 |
| Dec. 6, 1988 | [JP] | Japan | 63-308122 |
| Dec. 6, 1988 | [JP] | Japan | 63-308123 |
| Dec. 6, 1988 | [JP] | Japan | 63-308125 |

[51] Int. Cl.$^5$ .................................. G03G 15/01
[52] U.S. Cl. .................................. 355/326; 346/157; 355/202; 355/210; 355/245; 355/274; 358/300
[58] Field of Search .......... 355/202, 210, 245, 326, 355/274, 244, 327; 346/160, 157; 358/300

[56] References Cited

U.S. PATENT DOCUMENTS

| 4,166,691 | 9/1979 | Ebi et al. .................. 355/202 |
| 4,275,958 | 6/1981 | Tachika et al. ............ 355/313 |
| 4,380,387 | 4/1983 | Yajima .................... 355/202 |
| 4,387,297 | 6/1983 | Swartz et al. ............. 235/462 |
| 4,562,130 | 12/1985 | Oka .................... 355/244 X |
| 4,603,566 | 7/1986 | Eastman et al. ............ 250/566 |
| 4,674,861 | 6/1987 | Kawamura ................. 364/525 |
| 4,755,852 | 7/1988 | Fujita .................... 355/208 |
| 4,794,419 | 12/1988 | Shibazaki et al. . |
| 4,825,246 | 4/1989 | Fukuchi et al. ............ 355/202 |
| 4,843,423 | 6/1989 | Nakamura et al. ......... 355/274 X |
| 4,876,571 | 10/1989 | Nakamura et al. .......... 355/210 |
| 4,884,104 | 11/1989 | Yoshida .................. 355/202 |
| 4,885,596 | 12/1989 | Egawa et al. ........... 355/326 X |
| 4,937,629 | 6/1990 | Maruyama et al. ........ 355/244 X |

FOREIGN PATENT DOCUMENTS

| 2595846 | 9/1987 | France ................... 355/202 |
| 49-131317 | 12/1974 | Japan . |
| 54-104834 | 8/1979 | Japan . |
| 55-123270 | 9/1980 | Japan . |
| 56-83757 | 7/1981 | Japan . |
| 57-61372 | 4/1982 | Japan . |
| 0178444 | 9/1985 | Japan ................... 355/202 |
| 60-216670 | 10/1985 | Japan . |
| 60-239764 | 11/1985 | Japan . |

Primary Examiner—A. T. Grimley
Assistant Examiner—William J. Royer
Attorney, Agent, or Firm—Burns, Doane, Swecker & Mathis

[57] ABSTRACT

An image processing apparatus includes first latent image formation section for forming an electrostatic latent image corresponding to an image of a document on a photoconductor by projecting light reflected from the document, and second latent image formation section for forming an electrostatic latent image on the photoconductor responsive to electric signals outputted from an image sensor. The image processing apparatus further includes first and second developing units for developing the electrostatic latent image formed on the photoconductor so as to form a toner image thereon by making toner adhere to unexposed and exposed portions of the photoconductor, respectively, and transfer charger for transferring the toner image formed on the photoconductor onto paper. A controller enables the first developing unit to operate and applies a voltage of a polarity corresponding to the enabled developing unit to the transfer charger when an electrostatic latent image is formed on the photoconductor by the first latent image formation section, and enables the second developing unit to operate and applies a voltage of a polarity corresponding to the enabled developing unit to the transfer charger when an electrostatic latent image is formed on the photocondcutor by the second latent image formation section.

16 Claims, 15 Drawing Sheets

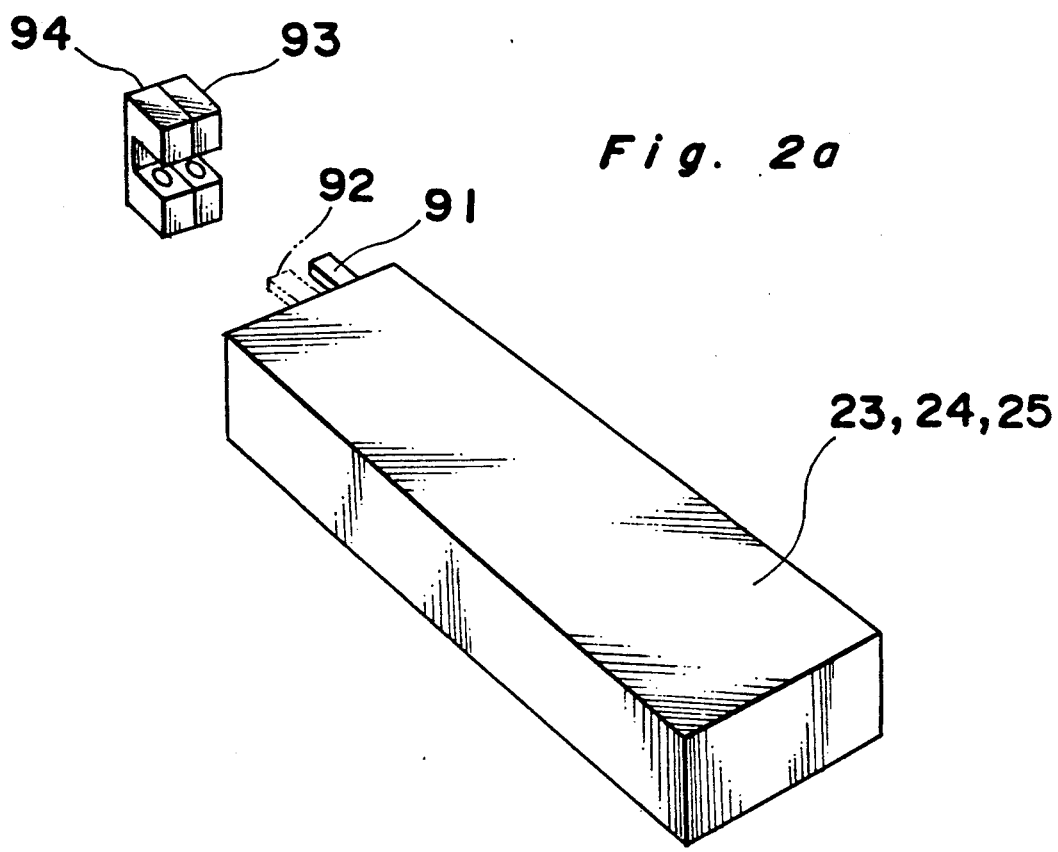
Fig. 2b
Fig. 2a
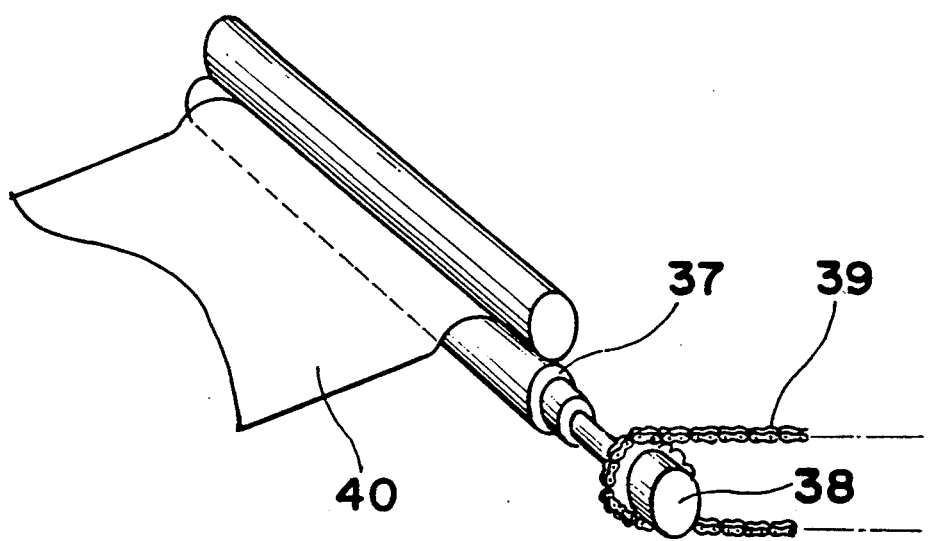
Fig. 3

IMAGE PROCESSING APPARATUS OPERABLE ANALOGUE AND DIGITAL COPYING MODES

BACKGROUND OF THE INVENTION

1. Field of the Invention

The present invention relates to an image processing apparatus operable in plural copying modes, and more particularly, to an image processing apparatus operable in plural copying modes such as an electrophotographic copying machine comprising analogue and digital copying modes.

2. Description of Related Art

Conventionally, as electrophotographic copying machines, there have been provided an analogue copying machine for forming a latent image on a photoconductor and developing the latent image into a visible toner image so as to print an so-called analogue image on a sheet of copying paper, and a digital copying machine for printing dot images or so-called digital image on a sheet of copying paper according to digital image data.

In the digital copying machine, after an image of a document (referred to as a document image hereinafter) is read and converted into analogue electric signals by an image sensor, the analogue electric signals are converted into digital image data by an analogue to digital converter. Further, an exposure head such as an LED head forms dot images on a photoconductive drum according to the digital image data so as to form an electrostatic latent image thereon. Thereafter, in the manner well known to those skilled in the art, the electrostatic latent image is developed into a visible toner image with toner, and the toner image is transferred onto a sheet of copying paper.

The digital copying machine has such advantages that not only an editing operation such as a trimming operation can be performed, since digital image data can be processed by a digital electric circuit, but also digital image data can be stored in a storage unit and can be sent to an external unit.

On the other hand, the digital copying machine has such disadvantages that it is difficult not only to reproduce a half tone image but also to obtain a resolution higher than a predetermined resolution. In order to reproduce a half tone image, the dither matrix method is used generally. However, in this method, the resolution of the reproduced half tone image becomes low, resulting in degradation in the quality of the reproduced binary image such as character image or the like. Further, in order to heighten the resolution of the reproduced image, it is necessary to process a large amount of data for representing an image. Therefore, the digital copying machine requires not only a storage unit having a large memory capacity but also a longer processing time. Furthermore, when an image which has copied by a digital copying machine is recopied by a digital copying machine, in many cases, degradation in the quality of the recopied image is caused due to the moire phenomenon. Furthermore, when a half tone image which has been copied by a digital copying machine is recopied by a digital copying machine, there is caused remarkable degradation in the quality of the recopied image which is produced by a so-called generation copying operation. Therefore, it is necessary to utilize either an analogue copying machine or a digital copying machine depending on the use for copying an image and/or a document.

In order to solve the aforementioned problems of the conventional digital copying machine, there is proposed a method for reproducing both a binary image and a half tone image by processing image data so as to obtain a predetermined resolution, a method for performing the generation copying operation by reducing the moire phenomenon using a filtering method, and a method for reading an image with use of an image reader having a higher resolution and for writing the read image in a high density so as to reproduce an image in a higher quality on a sheet of copying paper. However, in all the methods, the composition of the copying machine becomes complicated, resulting in increase in the manufacturing cost and decrease in the processing speed thereof.

On the other hand, documents which are copied in offices are binary information such as characters, numerals, line drawings, and also it is necessary to often produce a hard copy of image data of an half tone image. Therefore, the analogue copying machine has higher performance in works in offices than the digital copying machine, generally.

In order to perform various kinds of copying operation, there has been proposed a copying machine of composite type comprising an analogue copying system and a digital copying system. In the copying machine of this type, the analogue and digital copying systems utilize a common electrophotographic printing section. However, the analogue copying system utilizes an exposure optical system for projecting light reflected from a document onto a photoconductor. On the other hand, the digital copying system utilizes an image read section using a CCD image sensor or the like, and an image write section such as laser printer or the like. Either the analogue copying system or the digital copying system of the copying machine of composite type can be used depending on the use so as to make the best use of the features of each copying system. For example, when a copy which has been produced by the digital copying system is recopied, degradation in the quality of the image can be reduced by reproducing the copy using the analogue copying system. Furthermore, an analogue half tone image and a digital binary image can be composed by the copying machine of composite type.

In a copying machine of composite type proposed in the Japanese patent laid open publication (JP-A) No. 55-123270/1980, there are performed an image write process for writing an image on a photoconductor in the analogue copying mode and an image read process using a CCD image sensor in the digital copying mode, wherein the image write process and the image read process are performed using separate optical systems, respectively. It is to be noted that, in this copying machine of composite type, a digital image write process can be performed using optical fiber tubes. Therefore, this copying machine of composite type has such a disadvantage that the composition thereof becomes complicated.

Furthermore, in a two-color copying machine proposed in the Japanese patent laid open publication (JP-A) No. 56-83757/1981, an analogue copying operation is performed in a positive exposure process, and a digital image write operation is performed in a negative exposure process using a laser scan optical system and optical fiber tubes. This copying machine of this type has such disadvantages that the composition thereof becomes large and the manufacturing cost thereof becomes high since the laser scan optical system is used in the digital image write operation. It is to be noted that the copying machine of this type can not be solely used as a digital copying machine since it is necessary to use another optical system which is arranged in another machine in order to perform an image read operation.

When an LED head having a small configuration is used as an image write head used in the digital copying operation, an image write optical system comprising the LED head becomes smaller than a laser scan optical system, resulting in that the copying machine can be miniaturized. Therefore, a copying machine of composite type for utilizing not only the functions and the composition of the analogue copying machine but also an LED head as an image write head with combining the peripheral circuits therewith can be constituted without a complicated composition.

However, when the power is supplied to the LED head in order to light the LEDs thereof, the LEDs radiate heat. Therefore, if the LEDs are turned on for a long time interval, the life of each LED is shortened. By the way, the logic of digital image data to be used for lighting the LEDs can be inverted easily by an inverter. Therefore, the LEDs can be lighted so as to write not only an image portion of a document but also a non-image portion thereof on a photoconductor. However, since an area of an image portion of a document is generally smaller than that of a non-image portion thereof, the LEDs are preferably lighted so as to form the image portion of the document on a photoconductor.

However, in the analogue copying operation, light of non-image portion of a document reflected from the document is projected onto the photoconductor so as to form the image of the non-image portion thereon. Therefore, the LEDs can not be lighted so as to form the image portion thereof on the photoconductor in the digital copying operation by only combining the LED head with the analogue copying machine.

In a two-color copying machine proposed in the Japanese patent laid open publications, for example, (JP-A) Nos. 54-104834/1979 and 56-83757/1981, a two-color copying operation is performed in one copying cycle with use of two kinds of toners having different colors and different polarities of the electric potentials. In the copying machine of this type, latent images of respective colors are formed on a photoconductor with use of separate image write systems such as a projection optical system for projecting a document image on the photoconductor and a laser scan optical system or optical fiber tubes etc. and two pairs of multi stylus heads, so as to have different polarities of the electric potentials, resulting in two-color toner image.

SUMMARY OF THE INVENTION

An essential object of the present invention is to provide an image processing apparatus operable in plural copying modes, which is capable of performing copying operation with use of an exposure head such as an LED head in both of the analogue copying mode and the digital copying mode.

Another object of the present invention is to provide an image processing apparatus operable in plural copying modes, which is capable of performing copying operation in both of the analogue copying mode and the digital copying mode, and switching over from one copying mode to another copying mode when the process of one copying mode can not be performed so as to avoid a system down of the image processing apparatus.

A further object of the present invention is to provide an image processing apparatus operable in plural copying modes, which is capable of performing copying operations in both of the analogue copying mode and the digital copying mode so as to obtain desirable color reproduction characteristics, respectively.

In order to accomplish the aforementioned objects, according to one aspect of the present invention, there is provided an image processing apparatus comprising:

photoelectric conversion means for reading an image of a document set on a document table and for outputting electric signals corresponding to the image of the document;

a photoconductor;

first latent image formation means for forming an electrostatic latent image corresponding to an image of a document set on said document table onto said photoconductor by projecting light reflected from the document on said photoconductor so as to form the image of the document thereon;

second latent image formation means for forming an electrostatic latent image on said photoconductor by projecting light on said photoconductor responsive to electric signals outputted from said photoelectric conversion means so as to form dot images thereon;

first developing means for developing the electrostatic latent image formed on said photoconductor so as to form a toner image thereon by making toner adhere to unexposed portions of said photoconductor;

second developing means for developing the electrostatic latent image formed on said photoconductor so as to form a toner image thereon by making toner adhere to exposed portions of said photoconductor;

transfer means for transferring the toner image formed on said photoconductor onto paper; a polarity of a voltage to be applied to said transfer means being switched over between positive and negative; and control means for enabling said first developing means to operate and applying a voltage of a polarity corresponding to the enabled first developing means to said transfer means when an electrostatic latent image is formed on said photoconductor by said first latent image formation means, and for enabling said second developing means to operate and applying a voltage of a polarity corresponding to the enabled second developing means to said transfer means when an electrostatic latent image is formed on said photoconductor by said second latent image formation means.

According to another aspect of the present invention, there is provided an image processing apparatus comprising:

an image sensor for reading an image of a document set on a document table and for outputting electric signals corresponding to the image of the document;

a photoconductor;

optical means for selectively forming an image reflected from a document set on said document table onto either of said photoconductor or said image sensor;

an exposure head for forming dot images on said photoconductor responsive to the electric signals outputted from said image sensor;

first developing means for developing the electrostatic latent image formed on said photoconductor so as to form a toner image thereon by making toner adhere to unexposed portions of said photoconductor;

second developing means for developing the electrostatic latent image formed on said photoconductor so as to form a toner image thereon by making toner adhere to exposed portions of said photoconductor;

transfer means for transferring the toner image formed on said photoconductor onto paper, a polarity of a voltage to be applied to said transfer means being switched over between positive and negative depending on the used developing means;

mode selection means for selecting one copying mode among plural copying modes and for outputting a mode selection signal representing the selected at least one operation mode, the copying mode including: a first copying mode for enabling said optical means to form an image reflected from a document set on said document table onto said photoconductor so as to form an electrostatic latent image thereon, enabling said first developing means to develop the electrostatic latent image so as to form a toner image thereon, and enabling said transfer means to transferring the toner image onto paper, and a second copying mode for enabling said exposure head to form dot images on said photoconductor so as to form an electrostatic latent image thereon, enabling said second developing means to develop the electrostatic latent image so as to form a toner image thereon, and enabling said transfer means to transferring the toner image onto paper; and control means for executing the process of the selected copying mode responsive to the mode selection signal.

According to a further aspect of the present invention, there is provided the image processing apparatus further comprising:

first detection means for detecting whether or not said first developing means can operate;

wherein said control means voids the selection of the first copying mode and executes the process of the second copying mode when the first copying mode is selected by said mode selection means and said first detection means detects that said first developing means can not operate.

According to a more further aspect of the present invention, there is provided the image processing apparatus further comprising:

second detection means for detecting whether or not said second developing means can operate; and inversion means for inverting the electric signals outputted from said image sensor;

wherein said control means enables said inversion means to invert the electric signals outputted from said image sensor so as to output the inverted electric signals to said exposure head, enables exposure head to form dot images on said photoconductor responsive to the electric signals so as to form an electrostatic latent image thereon, enables said first developing means to develop the electrostatic latent image so as to form a toner image thereon, and enables said transfer means to transferring the toner image onto paper.

According to a still further aspect of the present invention, there is provided the image processing apparatus wherein said optical means comprises:

a first correction means for correcting a spectral sensitivity of said photoconductor equivalently, said first correction means being arranged on the optical path between said optical path switching means and said photoconductor; and a second correction means for correcting a spectral sensitivity of said image sensor equivalently, said second correction means being arranged on the optical path between said optical path switching means and said image sensor.

According to a still more further aspect of the present invention, there is provided an image processing apparatus comprising:

an image sensor for reading an image of a document set on a document table and for outputting electric signals corresponding to the image of the document;

inversion means for inverting the electric signals outputted from said image sensor;

a photoconductor;

an exposure head for forming dot images on said photoconductor responsive to the electric signals outputted from either of said image sensor and said inversion means;

first developing means for developing the electrostatic latent image formed on said photoconductor so as to form a toner image thereon by making toner adhere to unexposed portions of said photoconductor;

second developing means for developing the electrostatic latent image formed on said photoconductor so as to form a toner image thereon by making toner adhere to exposed portions of said photoconductor;

detection means for detecting whether or not said second developing means can operate; and control means for enabling said exposure head to form dot images on said photoconductor responsive to the electric signals outputted from said image sensor so as to form an electrostatic latent image thereon and enabling said second developing means to develop the electrostatic latent image so as to form a toner image thereon when said detection means detects that said second developing means can operate, and for enabling said exposure head to form dot images on said photoconductor responsive to the electric signals outputted from said inversion means so as to form an electrostatic latent image thereon and enabling said first developing means to develop the electrostatic latent image so as to form a toner image thereon when said detection means detects that said second developing means can not operate.

BRIEF DESCRIPTION OF THE DRAWINGS

These and other objects and features of the present invention will become clear from the following description taken in conjunction with the preferred embodiment thereof with reference to the accompanying drawings, in which:

FIGS. 2a and 2b are perspective views showing a developing unit arranged in the electrophotographic copying machine shown in FIG. 1, and photointerrupter switches, each of which is arranged so as to oppose to each developing unit;

FIG. 3 is a perspective view showing a resist roller arranged in the electrophotographic copying machine shown in FIG. 1, and peripheral units thereof;

DETAILED DESCRIPTION OF THE PREFERRED EMBODIMENT

An electrophotographic copying machine of composite type of a preferred embodiment according to the present invention will be described below in the order of the following items, with reference to attached drawings.

(a) Composition of copying machine
(b) Analogue copying mode
(c) Digital copying mode, image read mode and image write mode
(d) Color correction
(e) Register roller control
(f) Composition of control system
(g) Control flow of control system The electrophotographic copying machine of composite type comprises five operation modes as described in detail later, and is characterized in a mode selection control which is described in the chapter (g) with reference to FIGS. 13a to 13e, and a color correction which is described in the chapter (d).

(a) Composition of copying machine

Figure 1:
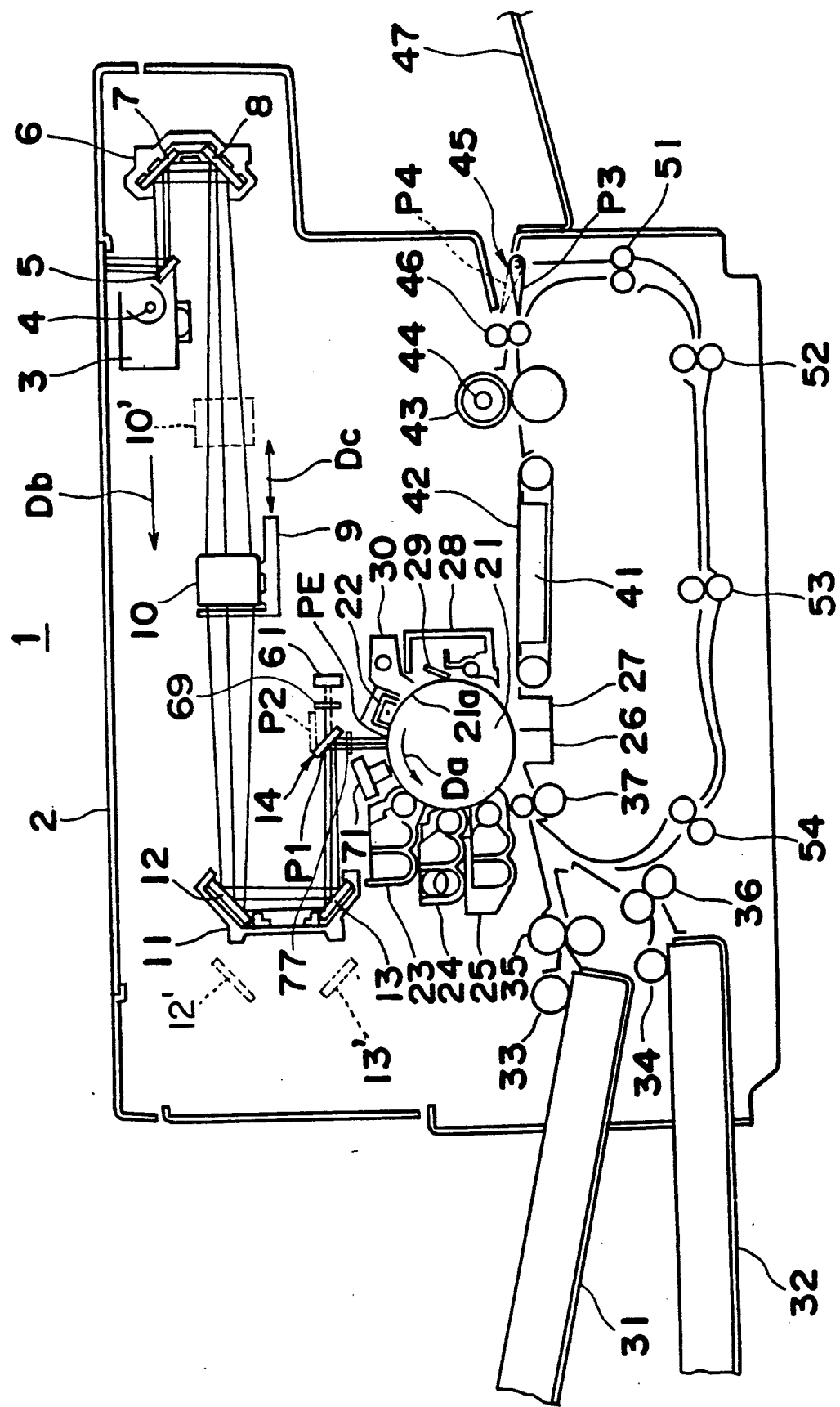
FIG. 1 is a schematic side view showing a composition of an electrophotographic copying machine of composite type of a preferred embodiment according to the present invention.

FIG. 1 shows the composition of the electrophotographic copying machine 1 of the preferred embodiment according to the present invention.

Referring to FIG. 1, the electrophotographic copying machine 1 mainly comprises a pivotable reflection mirror 14 which is arranged at the most nearest position to a photoconductive drum 21 among plural reflection mirrors constituting an optical system, a line type CCD image sensor 61 for reading an image, and an LED head 71 for writing an image and peripheral circuits thereof, in addition to a conventional analogue electrophotographic copying machine, wherein the pivotable mirror 14 can be rotated and the position thereof is switched over between either a first position P1 or a second position P2, as described later.

The electrophotographic copying machine 1 comprises an analogue copying mode, a digital copying mode, an image read mode for reading an image using the CCD image sensor 61, and an image write mode for writing an image on the photoconductive drum 21 using the LED head 71. The electrophotographic copying machine 1 can be used as a facsimile after a telecommunication control section for transmitting image information through a telephone line and for receiving image information therethrough is added thereto.

One of the points different from the conventional copying machine is that the electrophotographic copying machine 1 comprises the CCD image sensor 61 and the LED head 71 which are used in the digital copying mode, in addition to a scan optical system for scanning light reflected from a document which is used in the analogue copying mode.

In the analogue copying mode, the position of the pivotable mirror 14 is switched over so as to be located at the first position P1. Then, a document set on an optically transparent glass document table 2 is illuminated by an illumination lamp 4 arranged within an illumination unit 3. After light reflected from the document passes through the scan optical system constituted by a reflection mirror 5 mounted on the illumination unit 3, reflection mirrors 7 and 8 mounted on a mirror unit 6, a scan lens 10 mounted on a lens support 9, reflection mirrors 12 and 13 mounted on a mirror unit 11, and the pivotable mirror 14, the light is incident onto a photoconductive layer 21a of the photoconductive drum 21 so as to form a document image thereon. It is to be noted that an exposure point on the photoconductive layer 21a is indicated by a reference PE as shown in FIG. 1.

As described in detail in the chapter (d), a first color correction optical filter 77 is arranged on the optical path between the pivotable reflection mirror 14 and the photoconductive drum 21, and a second color correction optical filter 69 is arranged on the optical path between the pivotable reflection mirror 14 and the CCD image sensor 61.

On the other hand, in the digital copying mode or the image read mode, among an optical system for enabling light reflected from the document to transmit from the document to the image sensor 61, there is used a partial of the optical system for enabling the reflected light to transmit to the pivotable mirror 14 in common with that used in the analogue copying mode, and the image sensor 61 is arranged at a position optically equivalent to the exposure point PE on the photoconductive layer 21a of the photoconductive drum 21. In the digital copying mode or the image read mode, the pivotable mirror 14 is rotated so that the position thereof is located at the second position P2, resulting in that the pivotable mirror 14 is outside from the optical path. Then, the light reflected from the reflection mirror 13 reaches the image sensor 61 without obstruction of the pivotable mirror 14. Since the optical path upon reading an image in the digital copying mode is almost common to that in the analogue copying mode, the composition of the electrophotographic copying machine 1 becomes simple.

Another of the points different from the conventional analogue copying machine is not only to switch over the polarity of the voltage for transferring a toner image to be applied to a transfer charger 26 between positive and negative but also to provide plural developing units 23, 24 and 25 containing toner having polarities different from each other. Namely, in the analogue copying mode, a normal developing operation is performed. On the other hand, in the digital copying mode or the image write mode, a reverse developing operation is performed.

Around the photoconductive drum 21 which is rotated in the counterclockwise direction as indicated by an arrow Da, there are provided a corona charger 22, the developing units 23, 24 and 25, the transfer charger 26, a cleaning unit 28 and an eraser lamp 30, in the manner similar to that of the conventional electrophotographic copying machine.

After an electrostatic latent image is formed on the photoconductive layer 21a of the photoconductive drum 21 which has been electrified uniformly with a negative electric potential by the corona charger 22, the electrostatic latent image is developed into a visible toner image by one of the developing units 23, 24 and 25. Thereafter, the toner image is transferred onto a sheet of copying paper by the transfer charger 26. The toner remaining on the photoconductive layer 21a of the photoconductive drum 21 is removed by the cleaning unit 28, and then, the photoconductive layer 21a is discharged by illuminating the surface thereof using the eraser lamp 30. On the other hand, the toner image formed on a sheet of copying paper is fixed by a fixing roller 43, and is discharged to a paper discharging tray 47.

In this process of the analogue copying mode, since the light reflected from the document is scanned in such a state that the photoconductive layer 21a of the photoconductive drum 21 is electrified uniformly with a negative electric potential, an electrostatic latent image is formed on a portion of the photoconductive layer 21a where the charge remains. In this case, when the electrostatic latent image is developed into a visible toner image in the normal developing operation by the developing unit 23 or 25 containing toner having positive electric potential, the toner image having positive electric potential is formed on the photoconductive layer 21a of the photoconductive drum 21. Then, when a negative voltage is applied to the transfer charger 26, the toner image is transferred onto a sheet of copying paper.

On the other hand, in the digital copying mode or the image write mode, the LED head 71 is turned on so as to emit above an image portion of the photoconductive layer 21a of the photoconductive drum 21 which has been electrified uniformly with a negative electric potential in order to shorten a time interval upon supplying the power to the LED head 71 so as to prolong the life of the LED head 71. Then, the charge of the image portion disappears therefrom, and the electrostatic latent image is formed thereon. Thereafter, when the electrostatic latent image is developed in the reverse developing operation by the developing unit 24 containing toner having negative electric potential, a visible toner image having the negative electric potential is formed on the image portion where the charge has disappeared. Thereafter, when a positive voltage is applied to the transfer charger 26, the toner image is transferred onto a sheet of copying paper.

It is to be noted that, the LED head 71 used in the digital copying mode or the image write mode is arranged between the corona charger 22 and the developing unit 23.

In the present preferred embodiment, a sheet of copying paper is fed from one of paper feeding cassettes 31 and 32 through a register roller 37 to a transfer section comprising the transfer charger 26.

Furthermore, there is provided a paper refeeding system comprising a pivotable gating nail member 45 and transportation rollers 51 to 54, so that a sheet of copying paper on which a toner image is fixed is transported to the register roller 37, again. Therefore, there can be performed a composite copying process where information such as the date is printed in the digital copying mode on a sheet of copying paper on which an analogue image has been printed thereon in the analogue copying mode. Since an analogue image and a digital image can be composed so as to print the composite image thereof on a sheet of copying paper, the electrophotographic copying machine 1 can be applied to a wider range of applications.

In the present preferred embodiment, the optical path in the digital copying mode and the optical path in the analogue copying mode are switched over by using the pivotable mirror 14. However, an optically semitransparent mirror may be used in place of the pivotable mirror 14. In this case, since the semitransparent mirror is mounted fixedly, it is not necessary to provide the movable portion thereof. In the analogue copying mode, one portion of the light reflected from the document is reflected by the semitransparent mirror, and then, the light is incident onto the photoconductive layer 21a of the photoconductive drum 21. On the other hand, in the digital copying mode, when the light reflected from the document is incident onto the semitransparent mirror, the light passes therethrough, and then, the light is incident onto the CCD image sensor 61 and is detected by the CCD image sensor 61. In the image write operation of the digital copying mode, since it is necessary to expose the photoconductive drum 21 to light in such a state that the exposure light is not incident thereto from the semitransparent mirror, the image read operation and the image write operation are performed so that a timing of the image read operation is suitably shifted from a timing of the image write operation.

(b) Analogue copying mode

The operation of the analogue copying mode and respective sections of the electrophotographic copying machine 1 will be described below.

In FIG. 1, the illumination unit 3 and the mirror unit 6 are located at a home position. Upon copying a document image in the analogue copying mode or upon reading an image using the image sensor 61, the illumination unit 3 and the mirror unit 6 of the optical system are moved in the left direction as indicated by an arrow Db at a predetermined speed by a mechanism (not shown) including a driving motor which is well known to those skilled in the art so as to scan the document image in a slit form. Then, the illumination unit 3 and the mirror unit 6 are moved so that a ratio of the movement speed of the illumination unit 3 to the movement speed of the mirror unit 6 becomes two and the optical length between the surface of the document and the scan lens 10 is kept constant at all times.

In FIG. 1, there are shown the positions of respective units of the optical system when the document image is scanned at a magnification of one or in an equal magnification mode, namely, in such a state that a magnification of an electrostatic latent image formed on the photoconductive layer 21a of the photoconductive drum 21 to an actual document image of a document set on the document table 2 is set at one. In the equal magnification mode, the movement speed of the illumination unit 3 and the rotation speed of the photoconductive drum 21 are adjusted so that they are substantially equal to each other.

The lens support 9 for mounting the scan lens 10 is moved in the left and right directions as indicated by arrows Dc in FIG. 1 by a mechanism (not shown) well known to those skilled in the art, so that the magnification can be changed.

When the magnification is set at two, the scan lens 10 is moved to a position as indicated by the reference numeral 10'. Then, in order to set the surface of the photoconductive layer 21a to a focal plane so as to correct the correction conjugate length of the optical path, the mirror unit 11 is moved so that the mirrors 12 and 13 are located at respective positions as indicated by numerical reference numerals 12' and 13'. Furthermore, since the rotation speed of the photoconductive drum 21 is set at a predetermined constant speed independent of the magnification, the movement speed of the illumination unit 3 is adjusted so as to be half the speed at the equal magnification.

It is to be noted that, in the present preferred embodiment, the photoconductive layer 21a of an organic photoconductor (OPC) is formed on the photoconductive drum 21 of aluminum, and the photoconductive layer 21a is electrified with a positive electric potential by the corona charger 22.

When the scanned document image is formed on the electrified photoconductive layer 21a, the charge having a negative electric potential on the photoconductive layer 21a disappears according to the intensity of the light reflected from the document. Namely, the charge corresponding to a bright portion of the document disappears from the photoconductive layer 21a and the charge corresponding to a dark portion thereof remains thereon, so that an electrostatic latent image corresponding to the document image is formed thereon.

As described above, around the photoconductive drum 21, there are arranged the developing units 23, 24 and 25 for developing an electrostatic latent image into a visible image with toner. In the present preferred embodiment, the developing unit 23 contains red color toner having a positive electric potential, the developing unit 24 contains black color toner having a negative electric potential, and the developing unit 25 contains black toner having a positive electric potential. Therefore, the developing unit 23 or 25 is used in the analogue copying mode.

On the developing unit 24 containing the toner having the negative electric potential, a projection 91 is formed as shown in FIG. 2. When the developing unit 24 is mounted at a predetermined position in the electrophotographic copying machine 1, a photointerrupter switch 93 is turned on. Further, on each of the developing units 23 and 25 containing the toner having the positive electric potential, a projection 92 is formed at a position as indicated by a dotted line shown in FIG. 2. When each of the developing units 23 and 25 is mounted at the predetermined position in the electrophotographic copying machine 1, a photointerrupter switch 94 is turned on. Therefore, the polarity of the toner contained in each developing unit can be judged based on the switching state of each of the photointerrupter switches 93 and 94.

Figure 12:
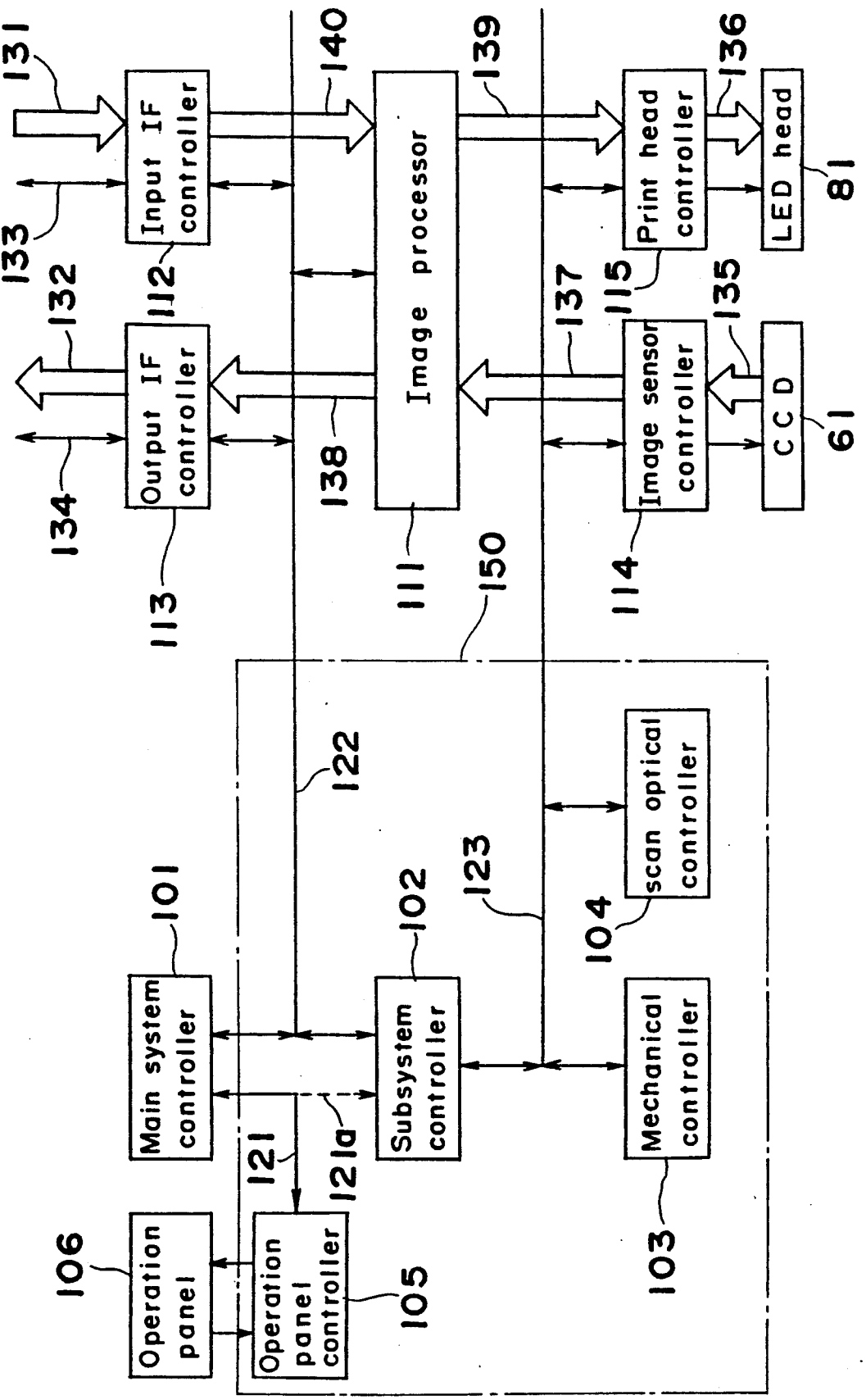
FIG. 12 is a schematic block diagram showing a control system of the electrophotographic copying machine shown in FIG. 1.

Responsive to an instruction entered using an operation panel 106 shown in FIG. 12, only one of these developing units 23, 24 and 25 is enabled to develop, and the others are disabled.

When the developing unit 25 is selected in the analogue copying mode, a portion of an electrostatic latent image formed on the photoconductive layer 21a which has been electrified with a negative electric potential is developed with black color toner having the positive electric potential into a visible toner image corresponding to a document image. Similarly, when the developing unit 23 is selected, an electrostatic latent image is developed into a visible toner image with red color toner having the positive electric potential. On the other hand, when the developing unit 24 is selected in the digital copying mode, a negative/positive reversed image is formed on the photoconductive layer 21a.

On the other hand, paper feeding cassettes 31 and 32, on which copying papers are set, are detachably mounted onto the electrophotographic copying machine 1, and only one of the paper feeding cassettes 31 and 32 is selected. When the paper feeding cassette 31 is selected, a sheet of copying paper is picked up from the paper feeding cassette 31 by a pick up roller 33 which is driven responsive to a control signal generated at a predetermined timing, and is transported toward the register roller 37 by a transportation roller 35. Thereafter, a sheet of copying paper is stopped at the register roller 37 in such a state that the edge thereof reaches the register roller 37. On the other hand, when the paper feeding cassette 32 is selected, a sheet of copying paper is picked up therefrom by a pick up roller 34, and is transported toward the register roller 37 by a transportation roller 36. Thereafter, a sheet of copying paper is stopped at the register roller 37 in such a state that the edge thereof reaches the register roller 37.

As shown i FIG. 3, the register roller 37 is connected to a driving motor (not shown) through a magnetic clutch 38 and a chain 39. A sheet of copying paper 40 transported from one of the paper feeding cassettes 31 and 32 waits in such a state that a sheet of copying paper 40 runs against the register roller 37 stopped.

When the edge of the visible toner image developed by one of the developing units 23, 24 and 25 reaches a predetermined position, the register roller 37 is driven by a control system described in detail later, and then, a sheet of copying paper 40 starts to run.

When a sheet of copying paper 40 is in contact with the photoconductive layer 21a of the photoconductive drum 21, the charge having an electric potential of a polarity opposite to that of toner is given to a sheet of copying paper 40 from the back side thereof by the transfer charger 26, so that not only a sheet of copying paper 40 is stuck closely to the photoconductive layer 21a but also the toner image formed on the photoconductive layer 21a is transferred onto a sheet of copying paper 40. Thereafter, a sheet of copying paper 40 is separated by a separating charger 27 to which an alternating-current high voltage is applied.

Almost all of the toner adhering on the photoconductive layer 21a is transferred onto the sheet of copying paper 40, however, a small amount of toner is not transferred thereonto, and then, the toner remains on the photoconductive layer 21a. After the residual toner is scraped off by a cleaning blade 29 arranged in a cleaning unit 28, it is collected into a waste toner bottle (not shown). Since some charge remains on the photoconductive layer 21a in such a state, the whole surface of the photoconductive layer 21a is exposed to light ,by an eraser lamp 30, and then, the photoconductive layer 21a returns to the initial state with no charge.

A sheet of copying paper having been separated from the photoconductive drum 21 is sucked by a suction unit 41 and is transported to a fixing roller 43 by a transportation belt 42.

A heating lamp 44 is arranged within a fixing roller 43, and the temperature of the surface of the fixing roller 43 is kept constant so as to melt toner adhering on a sheet of copying paper. When a sheet of copying paper passes through the fixing roller 43, the toner image adhering thereto is fixed, and then, the sheet of copying paper is discharged to the paper discharging tray 47 by the discharging roller 46 when the pivotable gating nail member 45 is located at a position P3 as indicated by the solid line in FIG. 1.

On the other hand, in a mode for printing an image of image data sent from an external unit such as a host computer onto a sheet of copying paper on which a document image has been printed in order to print a composite image composed of a document image and an image of image data thereon, the pivotable gating nail member 45 is rotated so as to be located at a position P4 as indicated by a dotted line in FIG. 1. At that time, a sheet of copying paper on which the document image is printed has been transported sequentially by respective transportation rollers 51 to 54, and then, a sheet of copying paper reaches the register roller 37 again and waits for the next copying operation.

(c) Digital copying mode, image read mode and image write mode

Each operation of the digital copying mode, the image read mode, and the image write mode will be described below.

In the analogue copying mode, the pivotable reflection mirror 14 is located at the position P1, and then, light reflected from the document is reflected by the reflection mirror 14 so as to project the light onto the exposure position PE on the photoconductive layer 21a of the photoconductive drum 21. On the other hand, upon reading a document image in the digital copying mode or the image read mode, the pivotable reflection mirror 14 is rotated so as to be located at the position P2. Then, the reflection mirror 14 is outside the optical path of the light reflected from the document, and the document image is formed on the line type CCD image sensor 61.

Figure 4:
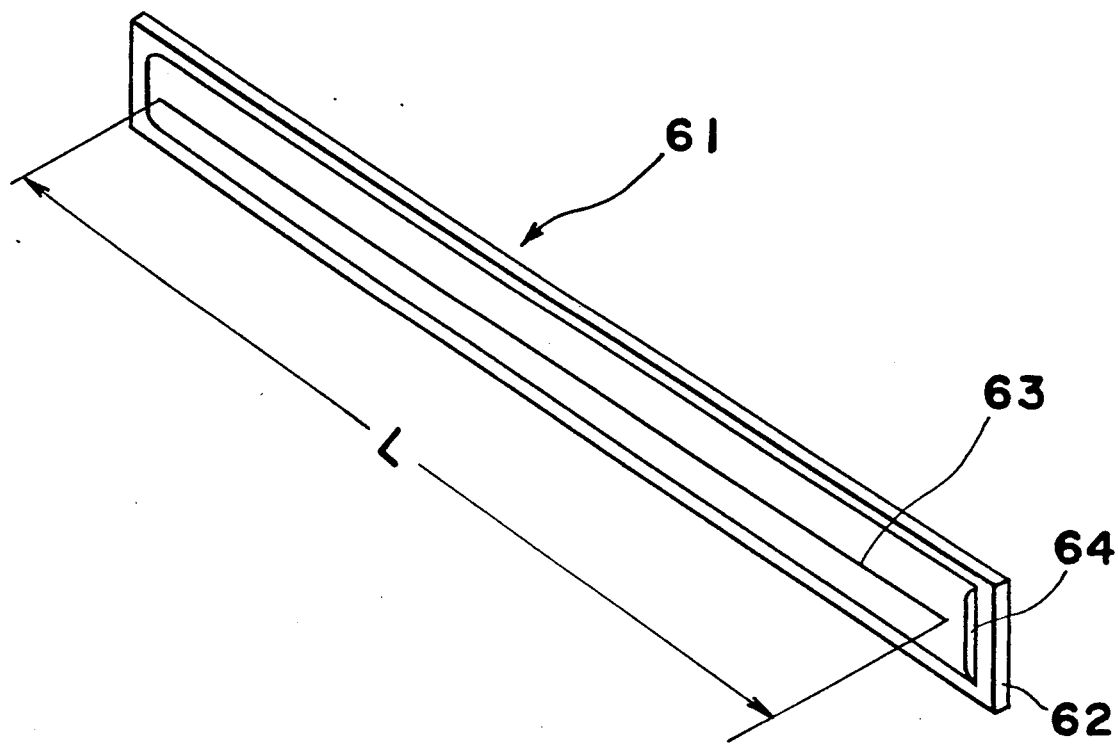
FIG. 4 is a perspective view showing a CCD image sensor mounted in the electrophotographic copying machine shown in FIG. 1.

As shown in FIG. 4, the image sensor 61 comprises 5000 photodetectors which are aligned in a arrangement density of 400/inch, wherein the length L of the photodetecting section composed of the photodetectors is about 12.5 inches.

In the equal magnification mode, the document image is digitalized in a resolution of 400 dots/inch. For example, when the scan lens 10 is located at the position as indicated by a dotted line 10' in FIG. 1, namely, when the magnification is set at two, the resolution thereof becomes 800 dots/inch.

FIG. 4 shows the CCD image sensor 61.

As shown in FIG. 4, CCD devices 63 are mounted on a ceramic substrate 62, and a transparent protection glass 64 is bonded thereon so as to cover the CCD devices 63. In the present preferred embodiment, the CCD image sensor is used as an image sensor device, however, there may be used an amorphous silicon image sensor or a Cds image sensor.

As described above, the image sensor 61 is arranged at the position shown in FIG. 1 so that a distance between the scan lens 10 and the image sensor 61 is equal to a distance between the scan lens 10 and the image forming surface of the photoconductive layer 21a of the photoconductive drum 21. The optical system between the document and the reflection mirror 13 to be used in the analogue copying mode is used in these modes. Therefore, the resolution upon reading an image using the image sensor 61 can be altered using the same control system as that to be used upon altering the magnification in the analogue copying mode.

Figure 5:
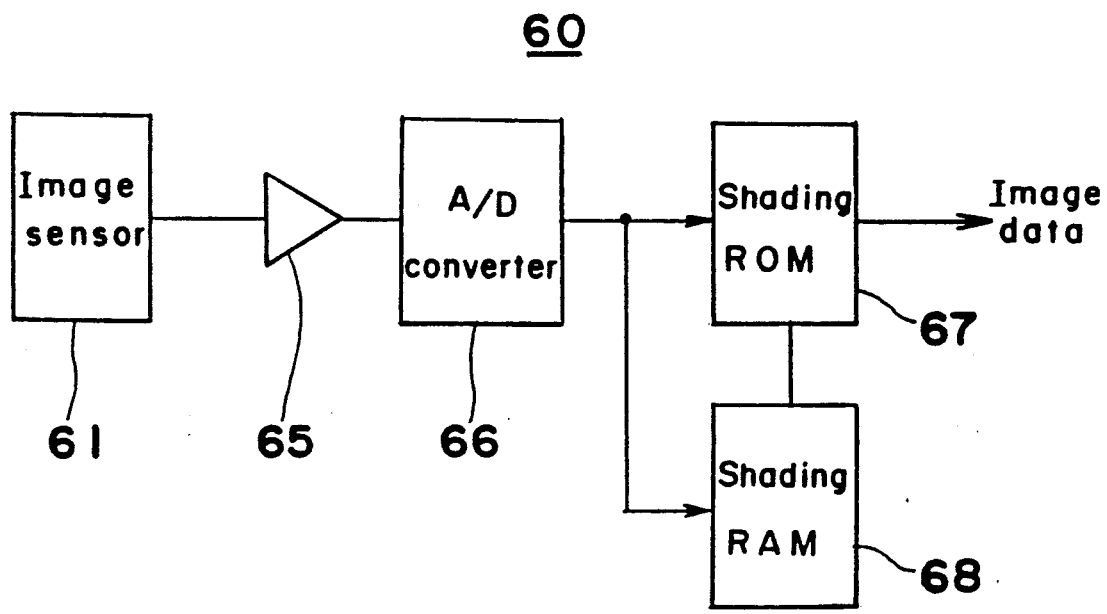
FIG. 5 is a schematic block diagram showing an image read circuit mounted in the electrophotographic copying machine shown in FIG. 1.

FIG. 5 shows an image read circuit 60.

Referring to FIG. 5, a document image is read and converted into analogue electric signals by the CCD image sensor 61, and the analogue electric signals are amplified by an amplifier 65. Thereafter, the amplified analogue electric signals are converted into digital image data by an analogue to digital converter (referred to as an A/D converter hereinafter) 66. In the present preferred embodiment, the converted image data are seven bits digital data having 128 levels in order to take decrease in the gradation due to a shading correction executed by the next step, into consideration.

In a conventional general image read system including the image read circuit 60 of the present preferred embodiment, even though a document image having a uniform density is read, the level of the digital image data outputted from the A/D converter 66 does not always become constant due to uniformity of the light amount of light radiated from the illumination lamp 4, decrease in the light amount of light passing through the outer edge of the scan lens 10, and dispersion of the sensitivity of each image sensor device.

In order to correct the dispersion produced in the optical image read system, there are provided a ROM 67 and a RAM 68 for the shading correction. Therefore, a shading in the level of the image data outputted from the A/D converter 66 is corrected by the ROM 67 and the RAM 68 in the manner well known to those skilled in the art, and then, the shading-corrected image data are outputted as read image data. A well known half tone process may be made for the shading-corrected image data by an image processor (not shown), or the shading-corrected image data may be outputted to an external unit through an interface section, if necessary. The description thereof is omitted therein since it is not the subject matter of the present invention.

Figure 6:
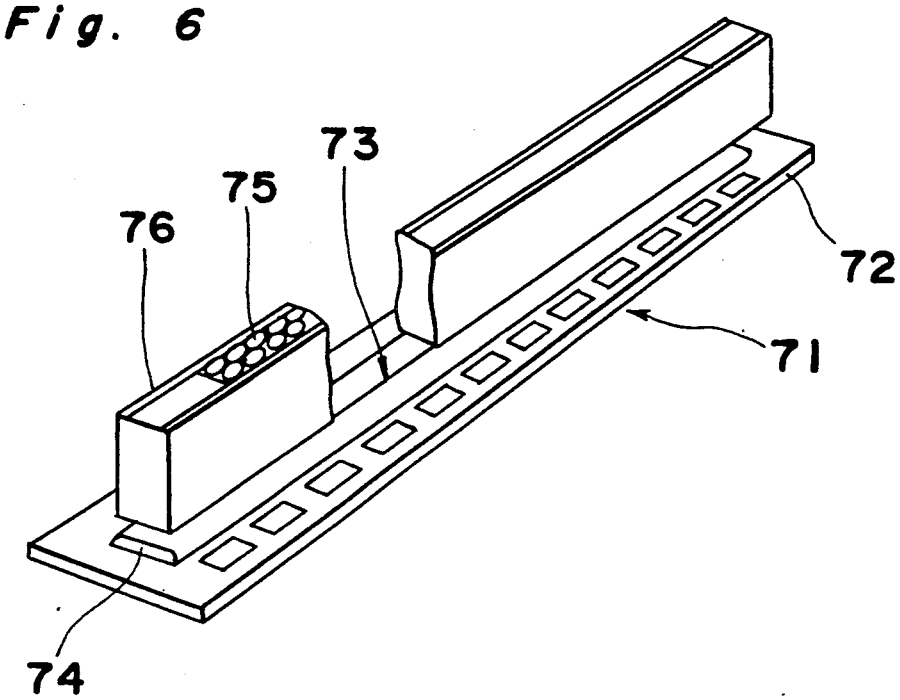
FIG. 6 is a perspective view showing an LED head mounted in the electrophotographic copying machine shown in FIG. 1.
Figure 7:
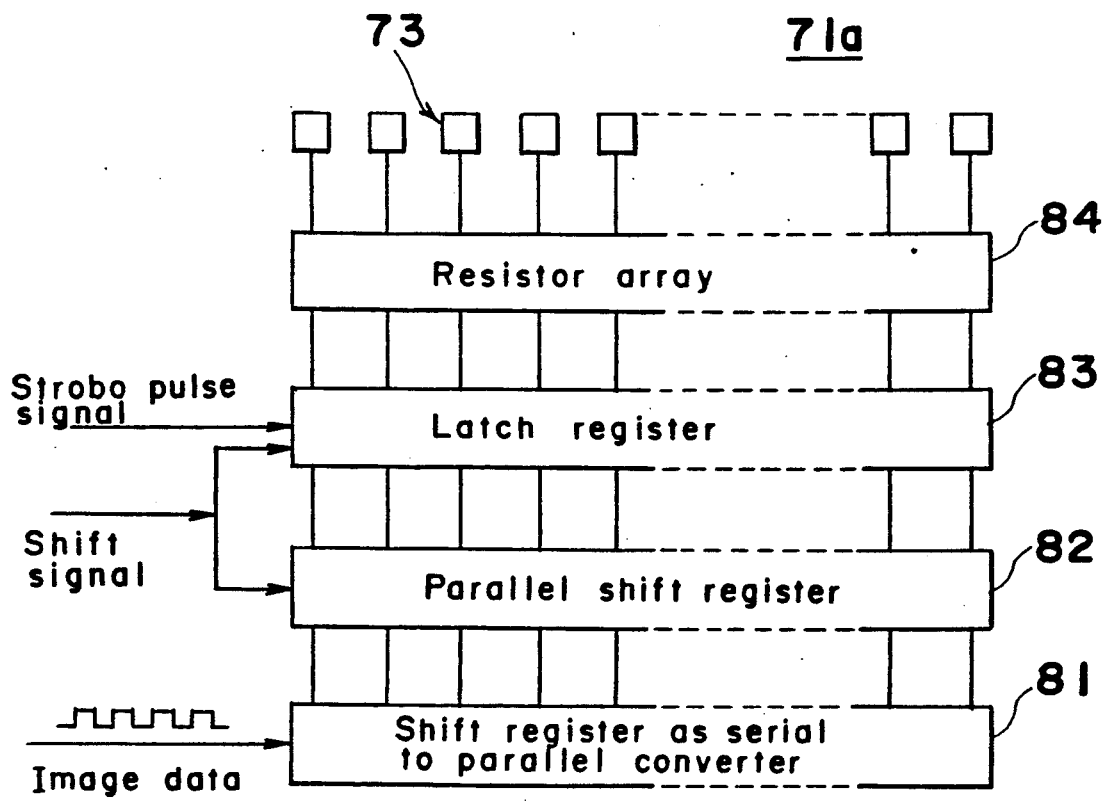
FIG. 7 is a schematic block diagram showing a driving circuit for driving the LED head shown in FIG. 6.

FIG. 6 shows the LED head 71 used as an exposure head for writing an image in the digital copying mode and the image write mode, and FIG. 7 shows a driving circuit 71a for driving the LED head 71.

In the LED head 71 shown in FIG. 6, an LED array 3 and electronic parts for constituting the driving circuit 1a shown in FIG. 7 are mounted on a ceramic substrate 72 on which a circuit pattern is printed. On the top surface of the LED array 73, an optically transparent protection glass 4 is bonded so as to cover the LED array 73, the driving circuit 71a and a wire boding section thereof (not shown), in order to protect them from an external environment. Above the protection glass 74, there is mounted a cell fox lens array 76 comprising plural rod lenses 75 in a cylindrical shape having a diameter of about 1 mm, and the cell fox lens array 76 scans LED light flickering according to the image data onto the photoconductive layer 21a so as to form bit images thereon. The ceramic substrate 72, on which the LED array 73 and the driving circuit 71a are mounted, and the cell fox lens array 76 are fixed by metallic parts (not shown) so that a distance between the cell fox lens array 76 and the LED array 73 becomes a predetermined distance. It is to be noted that, on a back surface of the ceramic substrate 72, an aluminum member for radiating heat generated in the LED array 73 is mounted.

Referring to FIG. 7, the driving circuit 71a for driving the LED head 71 comprises a shift register 81 as serial to parallel converter for converting serial image data of one line into parallel image data, a parallel shift register 82 for receiving the parallel image data outputted from the shift register 81 and for storing them temporarily, and a latch register 83 for latching the parallel image data outputted from the parallel shift register 82 and for outputting them for an output time interval indicated by a strobe pulse signal. The driving circuit 71a further comprises a resistor array 84 for limiting the current flowing into the switching devices and the LEDs which is connected to the LED array by a wire bonding method.

The action of the driving circuit 71a will be described below.

After serial image data of a first line are input to the shift register 81 as serial to parallel converter in synchronism with an image clock signal, serial image data are converted into parallel image data by the shift register 81 and then, responsive to a shift signal which is a horizontal synchronizing signal, the converted parallel image data are input to the parallel shift register 82, and also serial image data of a second line are input to the shift register 81. Responsive to the next shift signal, the parallel image data of the first line stored in the parallel shift register 82 are input to and are latched in the latch register 83. Also, the parallel image data of the second line are input to and are stored in the parallel shift register 82, and serial image data of a third line are input to the shift register 81.

When the strobe pulse signal having a pulse width of a time interval for lighting the LEDs is input to the latch register 83, respective LEDs of the LED array 73 are switched over according to the image data outputted from the latch register 83.

Thus, lighting operation of the LED array 73 is controlled according to the image data every one line, and bit images of one line are formed on the photoconductive layer 21a of the photoconductive drum 21.

(d) Color correction

Figure 8:
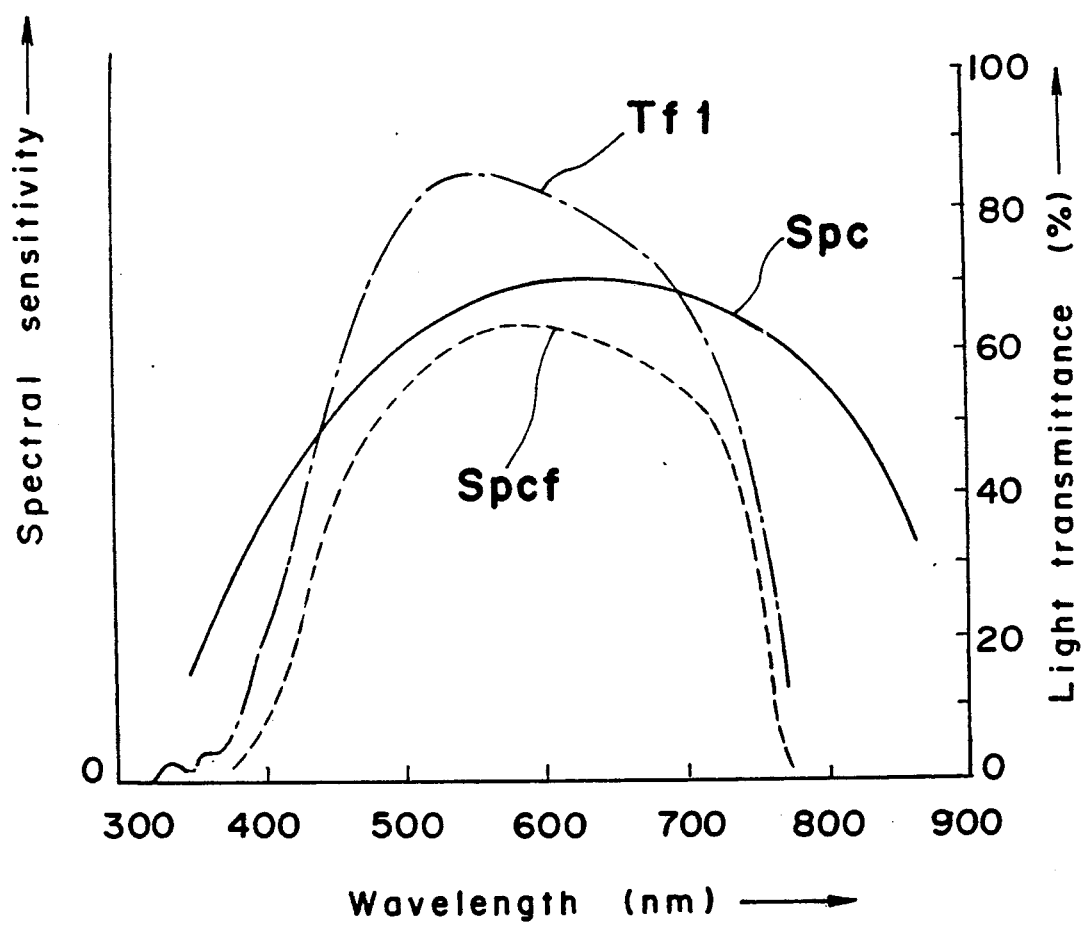
FIG. 8 is a graph showing a spectral sensitivity characteristic of a photoconductor of a photoconductive layer of a photoconductive drum and a light transmittance characteristic on a wavelength of light of a first color correction optical filter used in an analogue copying mode.

In the electrophotographic copying machine 1 of the present preferred embodiment, there is provided the illumination lamp 4 of a halogen lamp which is used in the analogue copying mode, and the LED head 71 having an emission wavelength of 680 nms which is used in the digital copying mode and the image write mode. Therefore, as a photoconductive material of the photoconductive layer 21a of the photoconductive drum 21, there is used a photoconductor (PC) having a spectral sensitivity as shown in a characteristic curve Spc of FIG. 8.

Since the photoconductor have a sensitivity higher than a predetermined sensitivity at a wavelength of light up to infrared region, there is provided the first color correction optical filter 77 for correcting colors of light in a normal analogue copying operation, namely, in the analogue copying mode of the present preferred embodiment. The first color correction optical filter 77 is arranged on the optical path between the pivotable reflection mirror 14 of the scan optical system and the photoconductive drum 21. The first optical filter 77 has a light transmittance characteristic on the wavelength of light shown in a characteristic curve Tfl of FIG. 8. Therefore, in an equivalent spectral sensitivity characteristic of the photoconductive layer 21a when taking into consideration that light passes through the optical filter 77 before the light is incident onto the photoconductive layer 21a, a wavelength region in which the equivalent sensitivity thereof becomes larger than a predetermined sensitivity is limited to a visible region as shown in a dotted line of FIG. 8.

Furthermore, as shown in FIG. 1, there is arranged the second color correction optical filter 69 on the optical path in the image read mode between the pivotable reflection mirror 14 and the CCD image sensor 61.

Figure 9:
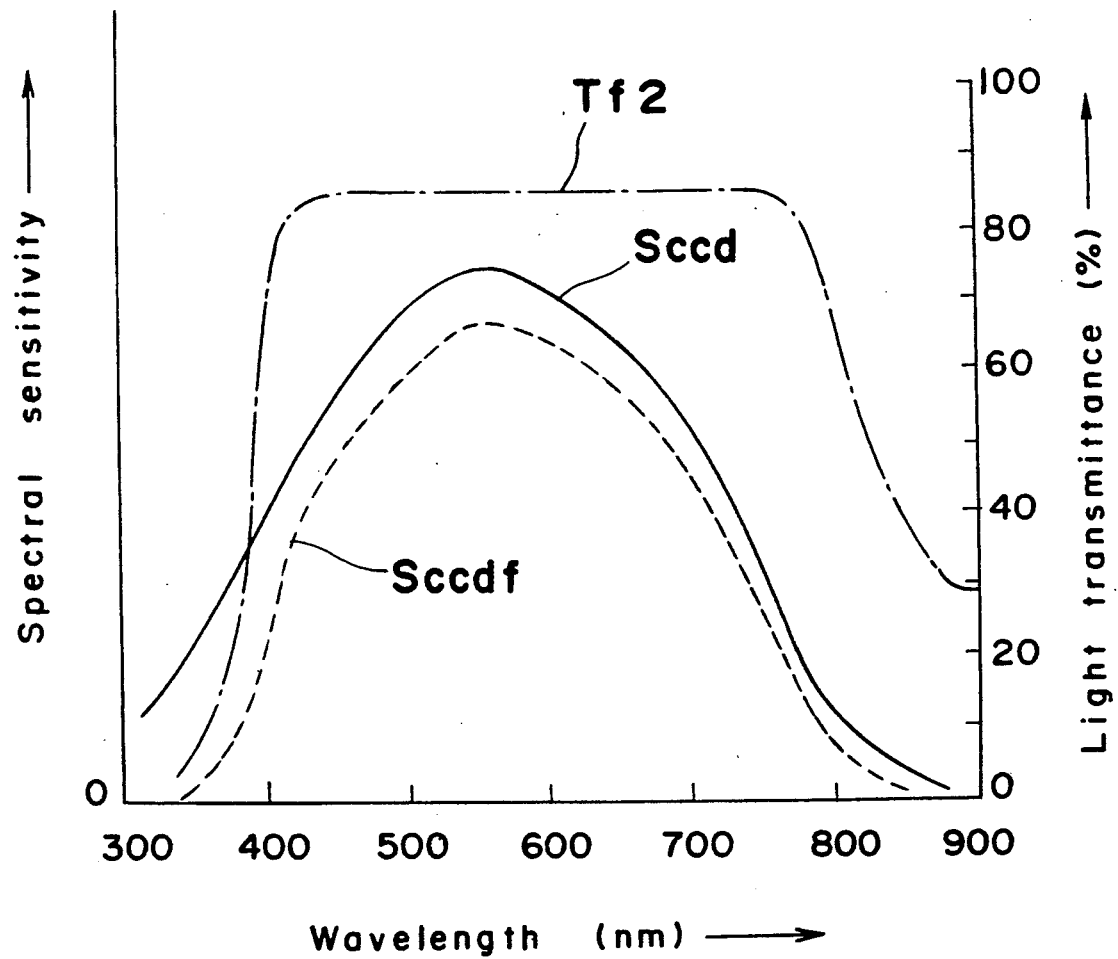
FIG. 9 is a graph showing a spectral sensitivity characteristic of a CCD image sensor and a light transmittance characteristic on a wavelength of light of a second color correction optical filter used in a digital copying machine and an image read mode.

FIG. 9 shows a spectral sensitivity characteristic of the CCD image sensor 61 which is represented by a solid line Sccd, a light transmittance characteristic on a wavelength of light of the second color correction optical filter 69 which is represented by an alternate long and short dash line Tf2, and an equivalent spectral sensitivity characteristic of the CCD image sensor 61 when taking into consideration that light passes through the second optical filter 69 before the light is incident onto the CCD image sensor 61. The second optical filter 69 has such a light transmittance characteristic on a wavelength of light that the equivalent spectral sensitivity characteristic of the CCD image sensor 61 becomes substantially the same as the aforementioned equivalent spectral sensitivity characteristic of the photoconductive layer 21a, namely, color reproduction characteristics in the analogue copying mode becomes substantially the same as that in the digital copying mode and the image read mode.

If the operator wishes that the color reproduction characteristics in the analogue copying mode is different from the color reproduction characteristics in the digital copying mode and the image read mode, there may be used respective optical filters 69 and 77 having such spectral sensitivities that desirable color reproduction characteristics can be obtained. Then, when one of separate color correction optical filters 69 and 77 is used depending on the selected operation mode, a desirable color reproduction can be obtained.

Alternatively, in place of the first color correction optical filter 77, the surface of the pivotable reflection mirror 14 may be coated with a film of color correction material such as a resin so as to correct the spectral sensitivity of the photoconductive layer 21a or so as to obtain a desirable equivalent spectral sensitivity. When either the digital copying mode or the image read mode is selected, the coated reflection mirror 14 is apart from the optical path. Therefore, the coated reflection mirror 14 does not influence the aforementioned equivalent spectral sensitivity characteristics of the CCD image sensor 61.

(e) Register roller control

There will be described below, control timings for a register roller control for controlling the register roller 37 upon transferring an electrostatic latent image formed on the photoconductive layer 21a onto a predetermined position of a sheet of copying paper.

Since the data writing method and the exposure position PE in the analogue copying mode are different from those in the digital copying mode and the image write mode, control timings for the register roller control upon transferring an electrostatic latent image formed on the photoconductive layer 21a onto a predetermined position of a sheet of copying paper in the analogue copying mode is different from those in the digital copying mode and the image write mode.

Figure 10:
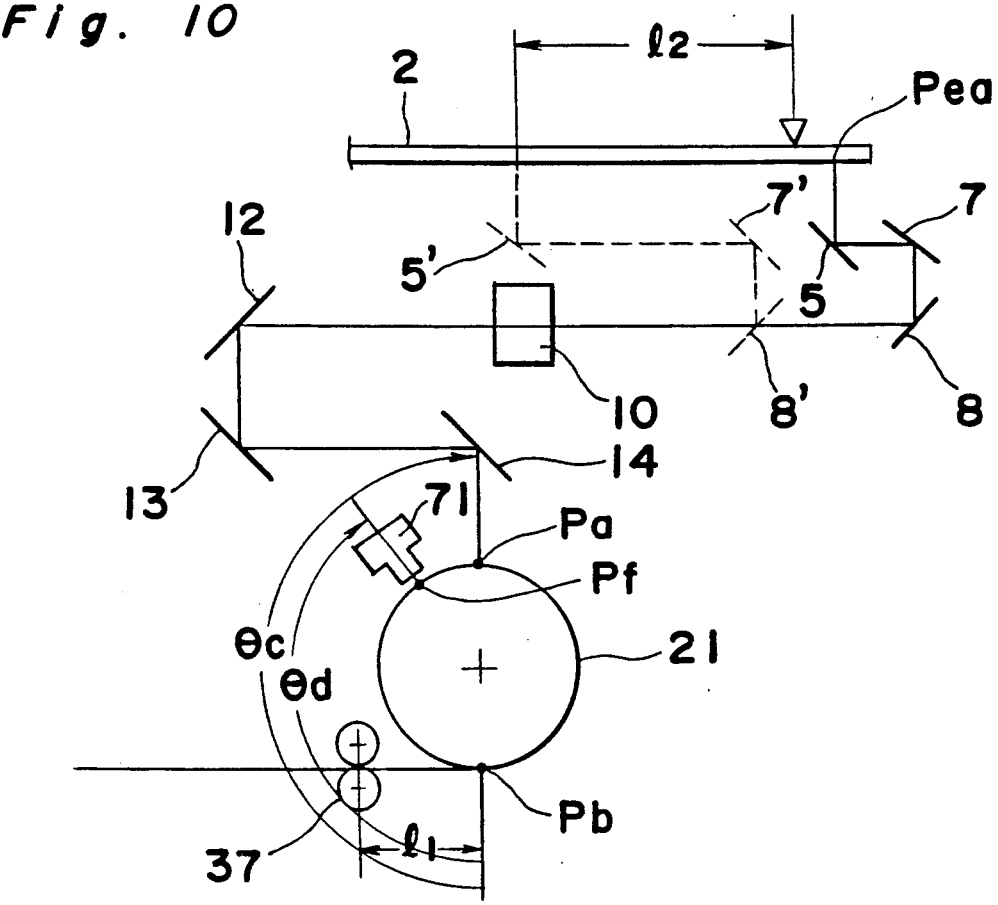
FIG. 10 is a schematic side view showing a partial portion of the electrophotographic copying machine shown in FIG. 1 for explaining operation timings of a resist control for controlling a resist roller shown in FIG. 1.
Figure 11:
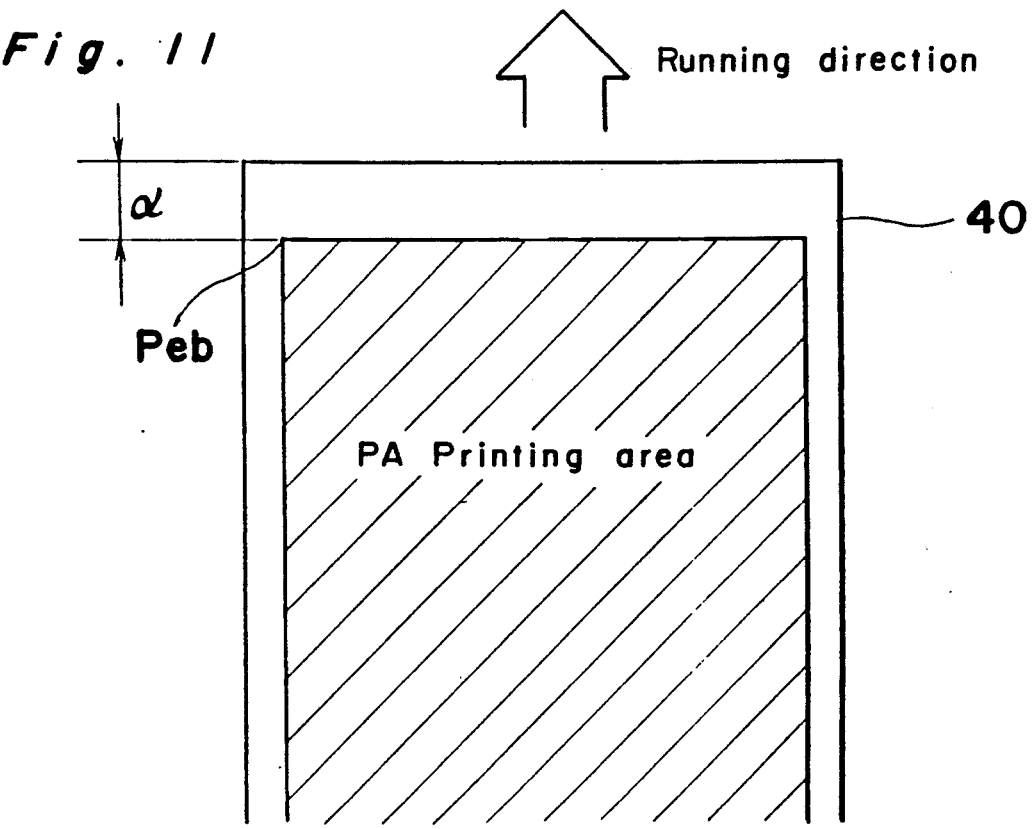
FIG. 11 is a plan view showing a printing area on a sheet of copying paper for defining a distance $a$.
Figure 13A:
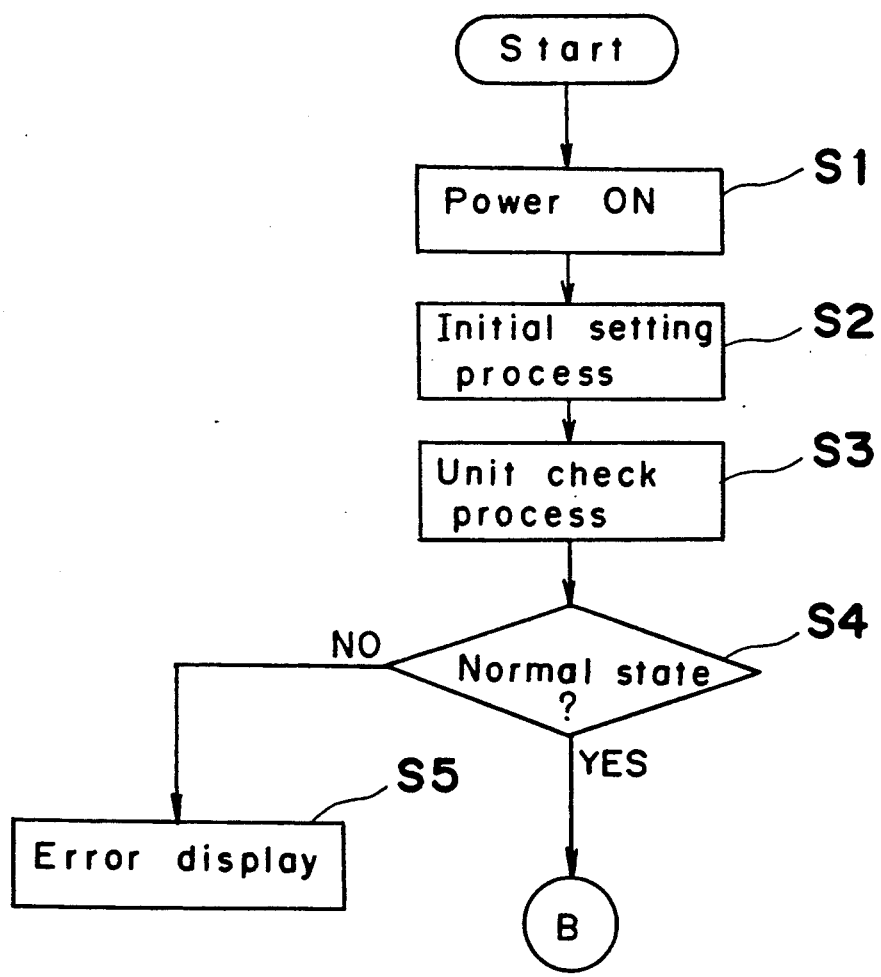
FIGS. 13a to 13e are flowcharts showing a main routine which is executed by a main system controller shown in FIG. 12.
Figure 13B:
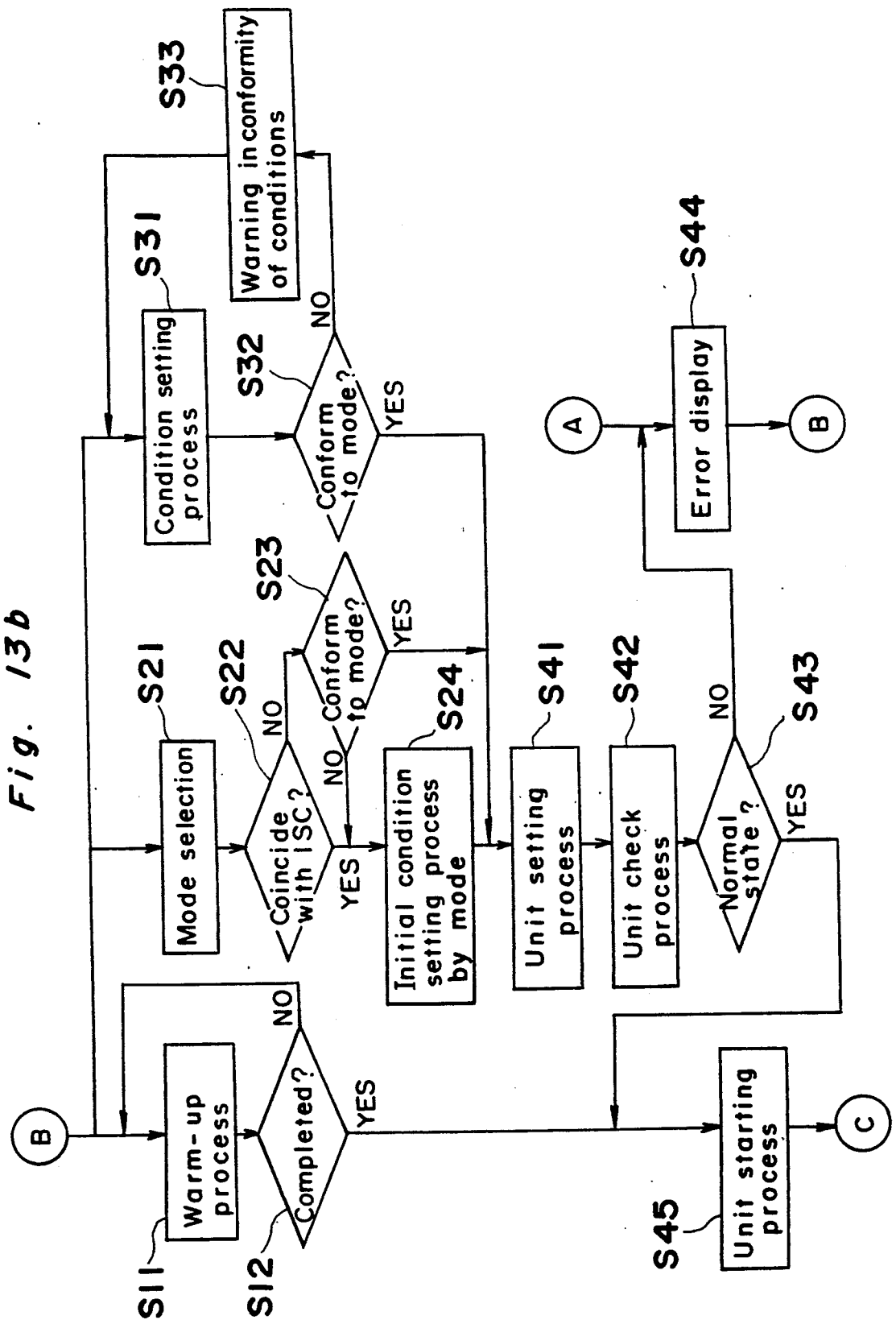
Figure 13C:
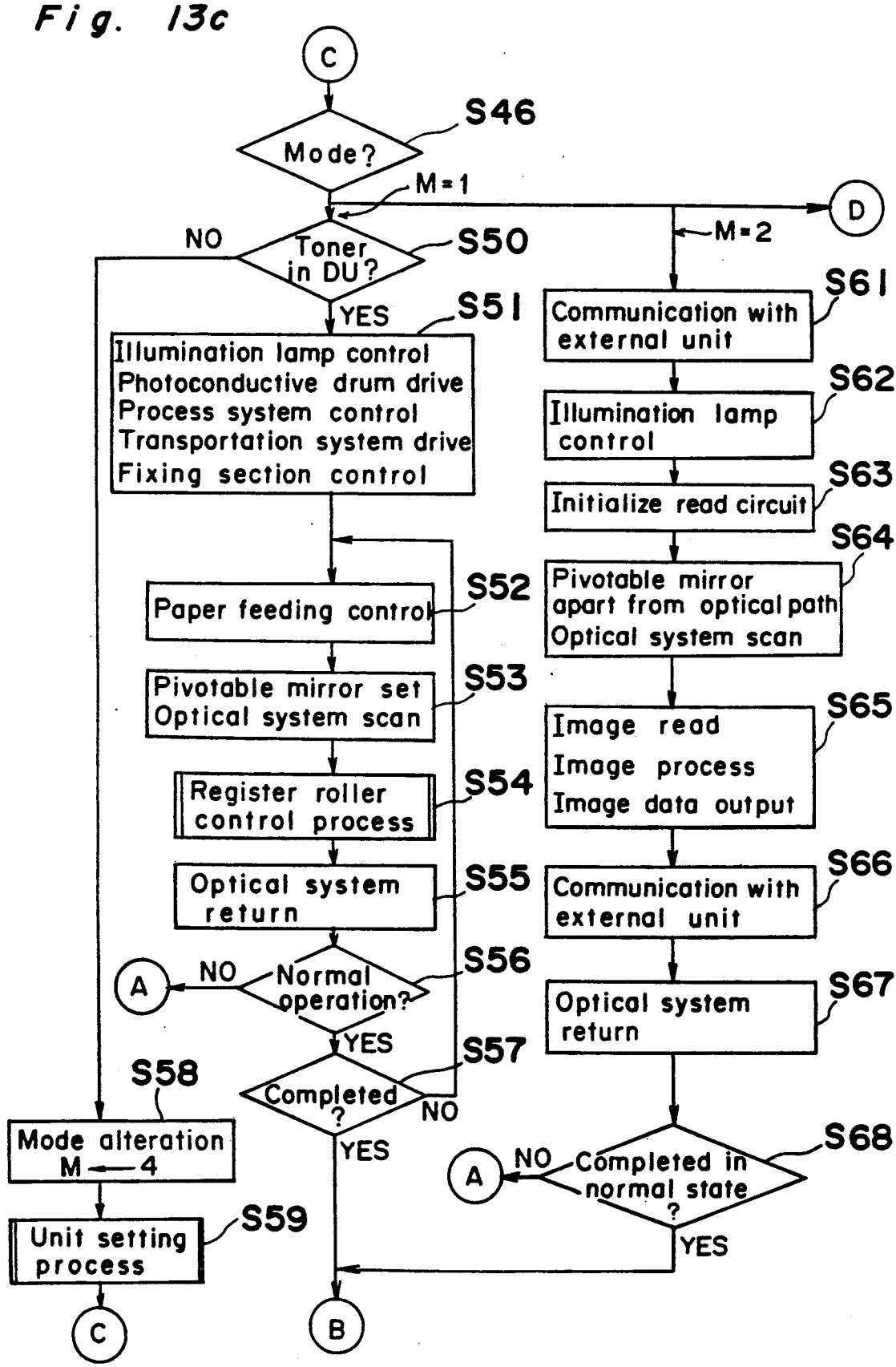

In the case of the register roller control in the analogue copying mode shown in FIG. 13c, a timer value to be set in a timer counter corresponding to a time interval for driving the magnetic clutch 38 for the register roller 37 shown in FIG. 3 is set at such a value that an edge of an electrostatic latent image formed on the photoconductive layer 21a corresponding to an edge Pea of a document image coincides with an edge Peb of a printing area PA on a sheet of copying paper shown in FIG. 11 when the edge of the electrostatic latent image thereof is rotated from the exposure position Pa to the transfer position Pb. Namely, the timer value is determined so that the timer counter has counted up to a precalculated timer value when the edge of the electrostatic latent image corresponding to the edge Pea of the document image is moved by rotation of the photoconductive drum 21 from the exposure position Pa by a difference $(lc-l_1)$ between a distance $lc$ corresponding to an angle $\theta c$ shown in FIG. 10 and a distance $l_1$ between the register roller 37 and the transfer position Pb. Concretely, the timer counter is started responsive to a starting signal outputted from a timer starting switch (not shown) which is turned on when the illumination unit 3 starts to move, and the timer counter counts a clock pulse which is outputted in synchronism with the movement of the illumination unit 3.

Since the movement distance of the illumination unit 3 while the edge of the electrostatic latent image corresponding to the document image moves by a distance $(lc-l_1)$, namely, a distance while the exposure point on the document moves for a time interval between a timing of the turning on point Pea of the timer starting switch and a timing for starting the register roller 37 varies depending on the magnification, a timer value corresponding to the magnification is calculated.

When the timer counter has counted up to the precalculated timer value, the magnetic clutch 38 is driven so that a sheet of copying paper 40 is transported by the register roller 37. In this case, since a timing when a sheet of copying paper 40 reaches the transfer position Pb coincides with a timing when the edge of the image reaches the transfer position Pb, the edge of the toner image formed on the photoconductive layer 21a coincides with the edge Peb of the printing area PA to be printed on a sheet of copying paper 40.

In the present preferred embodiment, as described above, since the timer counter counts the clock pulse outputted in synchronism with the movement of the illumination unit 3, it is necessary to calculate the timer value depending on the magnification. In the case that there is used an apparatus wherein a timer counter is started at a timing when the edge of the document starts to be exposed to light and counts a clock pulse outputted in synchronism with the rotation of the photoconductive drum 21, it is not necessary to correct the timer value according to the magnification. In this case, since the rotation speed of the photoconductive drum 21 is constant, it is necessary to correct the timer value only in order to substantially cancel a dispersion of the arranging position of the timer start switch and a dispersion of the arranging position of the timing controller 37.

On the other hand, in the digital copying mode shown in FIG. 13e, as described in detail later, another timer other than the timer used in the analogue copying mode starts to count the number. Thereafter, when another timer counts up to a predetermined time, the clutch 38 for the register roller 37 is driven, and a sheet of paper is transported by the register roller 37.

In this case, another timer is previously set at such a predetermined time that it counts up at a timing when the edge of the image printed on a sheet of paper 40 moves by a distance $(ld-l_1-\alpha)$ from the point Pf, wherein a distance $ld$ on the photoconductive drum 21 is a distance between the printing point Pf on the photoconductive drum 21, at which the LED head 71 prints dot images, and the transfer point Pb at which the dot images are transferred onto a sheet of paper 40 and corresponds to an angle interval $ld$ shown in FIG. 10, and $\alpha$ is a top margin amount corresponding to a distance between the top edge of a sheet of paper 40 and the printing start point Peb or the top edge of the printing area PA, as shown in FIG. 11. It is to be noted that the timer value to be set in another timer is corrected in order to cancel a dispersion of the arranging position of the LED head 71 and a dispersion of the arranging position of the register roller 37.

(f) Composition of control system

FIG. 12 shows a control system for controlling the electrophotographic copying machine 1 of the present preferred embodiment.

Referring to FIG. 12, a main system controller 101 comprising a CPU for controlling the whole of the electrophotographic copying machine 1 is connected to an operation panel controller 105 through a communication line 121, and also is connected to a subsystem controller 102, an image processor 111, an input interface controller (referred to as an input IF controller hereinafter) 112 and an output interface controller (referred to as an output IF controller hereinafter) 113 through a communication line 122.

The subsystem controller 102 is connected to a mechanical controller 103, a scan optical system controller 104, an image sensor controller 114 and a print head controller 115 through a communication line 123. The subsystem controller 103 controls respective controllers 103, 104, 114 and 115 according to an instruction sent from the main system controller 101, and sends information of each operation state of respective controllers 103, 104, 114 and 115 to the main system controller 101.

The mechanical controller 103 controls the units arranged around the photoconductive drum 21 and the units for feeding or transporting a sheet of paper based on a program stored therein according to an instruction sent from the main system controller 101, and sends information of each operation state of respective devices to the subsystem controller 102. For example, each operation state of the photointerrupter switches 94, 93 and 94 arranged respectively so as to oppose to the developing units 23 to 25 is supervised by the mechanical controller 103, and the mechanical controller 103 sends information of each operation state of respective photointerrupter switches 94, 93 and 94 to the subsystem controller 102, and further to the main system controller 101 through the subsystem controller 102.

The scan optical system controller 104 controls the devices of the optical system according to an instruction sent from the subsystem controller 102, and sends information of each operation state of respective devices thereof to the subsystem controller 102. Concretely, the scan optical system controller 104 controls the turning on or off operation and the light amount of the illumination lamp 4, each scan operation of the illumination unit 3 and the mirror unit 6, each movement operation of the scan lens 10 and the mirror unit 11 according to the magnification, and also calculates the scan speed of the scan optical system.

The operation panel controller 105 sends information of each operation state of the switches arranged on an operation panel 106 including mode selection switches (not shown) for selecting one or plural operation modes, to the main system controller 101, and the operation panel controller 105 also controls lighting operation of various kinds of indicators arranged on the operation panel 106.

The image sensor controller 114 receives image data sent from the CCD image sensor 61 responsive to an instruction of the subsystem controller 102, and instructs the image processor 111 to execute a specified process.

The LED head controller 115 receives image data sent from the image processor 111 or the input IF controller 112 responsive to an instruction of the subsystem controller 102, and also instructs the LED head 71 to write dot images of the image data on the photoconductive layer 21a of the photoconductive drum 21. Furthermore, the LED head controller 115 performs negative/positive reverse operation, the calculation of the printing area PA corresponding to the size of the copying paper, the editing operation of image data based on the calculated printing area PA, according to the information sent from the subsystem controller 102.

The image processor 111 performs a half tone process based on a specific dither pattern for image data sent from the image sensor controller 114 responsive to an instruction sent from the main system controller 101, and also performs compression process for image data. Further, the image processor 111 outputs the processed image data to the output IF controller 113, and outputs them to the LED head controller 115 so as to write dot images of the image data on the photoconductive layer 21a in the digital copying mode. Furthermore, the image processor 111 performs a recover process for image data received from an external unit by the input IF controller 112.

The output IF controller 113 performs communication control operation with external units responsive to an instruction sent from the main system controller 101, and outputs the image data processed by the image processor 111 to the external units.

The input IF controller 112 performs communication control operation with external units responsive to an instruction sent from the main system controller 101, and receives image data sent from the external units, and then, sends the received image data to the image processor 111 in order to convert the received image data into dot image data in a data form which can be written on the photoconductive layer 21a by the LED head 71.

The communication lines 121 and 122 which are connected to the main system controller 101 are provided for transmitting control commands and status data therethrough. The communication line 123 which is connected to the subsystem controller 102 is provided for transmitting control timing signals in addition to control commands and status data therethrough.

Control signal lines 131 and 132 for transmitting and receiving control signals between the input and output IF controllers 112 and 113 and the external units are selected depending on the external units connected thereto, and also image signal lines 133 and 134 for transmitting and receiving image data between the input and output IF controllers 112 and 113 and the external units are selected depending on the external units connected thereto.

An image signal line 135 connected between the image sensor 61 and the image sensor controller 114 and an image signal line 136 connected between the print head 71 and the print head controller 115 are image signal lines for transmitting serial image data, and the other image signal lines 137 to 140 are image signal lines for transmitting eight bits data in a parallel form.

In FIG. 12, a control section for controlling the conventional analogue the electrophotographic copying machine is indicated by an alternate long and short dash line 150, and the control system of the present preferred embodiment utilizes this control section in order to constitute the electrophotographic copying machine 1. In the conventional electrophotographic analogue copying machine, the operation panel controller 105 is connected to the subsystem controller 102 through a control line 121a.

The main system controller 101 controls the composite printing operation, responsive to information of each operation state of the photointerrupter switches 93 and 94 and information of the operation entered using the operation panel 106 which is sent from the operation panel controller 105. In the composite printing operation, for example, an image of digital image data sent from an external unit such as a host computer is printed on a sheet of copying paper on which an analogue document image has been printed in the analogue copying mode. Namely, the LED head 71 writes dot images corresponding to the digital image data sent from the external unit so as to form an electrostatic latent image corresponding to the dot images on the photoconductive layer 21a of the photoconductive drum 21, and the electrostatic latent image is developed into a visible toner image in the manner as described above. When the register roller clutch 38 is started, the visible toner image is transferred onto a sheet of copying paper.

(g) Control flow of control system

FIGS. 13a to 13e are flowcharts of a main routine which is executed by the main system controller 101 shown in FIG. 12.

Referring to FIG. 13a, when main switch (not shown) is turned on so as to supply the power to the electrophotographic copying machine 1 at step S1, an initial setting process is performed at step S2. Thereafter, there is performed a unit check process for checking whether or not respective units are operable in a normal state at step S3. If at least one unit is not operable in a normal state (No at step S4), an error message is displayed on the operation panel 106 at step S5.

On the other hand, if all the units are operable in a normal state (Yes at step S4), there are performed in parallel a warm-up process (step S11), a mode selection process (step S21) for selecting one operation mode using the operation panel 106, and a condition setting process (step S31), as follows.

The warm-up process (step S11) is performed continuously until the warm-up process is completed (Yes at step S12). After the warm-up process is completed, the program flow goes to step S45, and then, a unit starting process is performed at step S45.

On the other hand, in the mode selection process, one operation mode is selected using the operation panel 106 at step S21 among the four operation modes; the analogue copying mode, the image read mode, the image write mode and the digital copying mode. At step S21, when either the analogue copying mode, the image read mode, the image write mode or the digital copying mode is selected, the mode selection flag M is set at one, two, three, or four, respectively.

Thereafter, it is judged at step S22 whether or not operation conditions of the electrophotographic copying machine 1 which have been set already coincide with predetermined initial conditions of the selected operation mode, and it is judged whether or not the set operation conditions thereof conform to predetermined suitable conditions of the selected operation mode (referred to as mode conditions hereinafter) at step S23, wherein the initial conditions are predetermined by operation mode. When the set operation conditions of the electrophotographic copying machine 1 coincide with the initial conditions of the selected operation mode (Yes at step S22) or when the set operation conditions do not conform to the mode conditions of the selected operation mode (No at step S23), the operation conditions are set at the predetermined initial conditions of the selected operation mode at step S24. Thereafter, the program flow goes to step S41. On the other hand, when the set operation conditions do not coincide with the initial conditions of the selected operation mode (No at step S22) and the set operation conditions conform to the mode conditions of the selected operation mode (Yes at step S23), the program flow goes to step S41.

Furthermore, operation conditions such selection of a paper feeding cassette are set using the operation panel 106 at step S31, and then, it is judged whether or not the set operation conditions conform to the mode conditions of the selected operation mode at step S32. When the set operation conditions do not conform to the mode conditions (No at step S32), a message for informing that the inconformity of the conditions is displayed on the operation panel 106 so as to warn of this state to the operator at step S33, and then, the program flow goes back to step S31. On the other hand, when the set copying conditions of the selected operation mode conform to the mode conditions (Yes at step S32), the program flow goes to step S41.

Table 1 shows the operation conditions of respective operation modes. In Table 1, "O" denotes copying conditions to be set in each operation mode.

Figure 14:
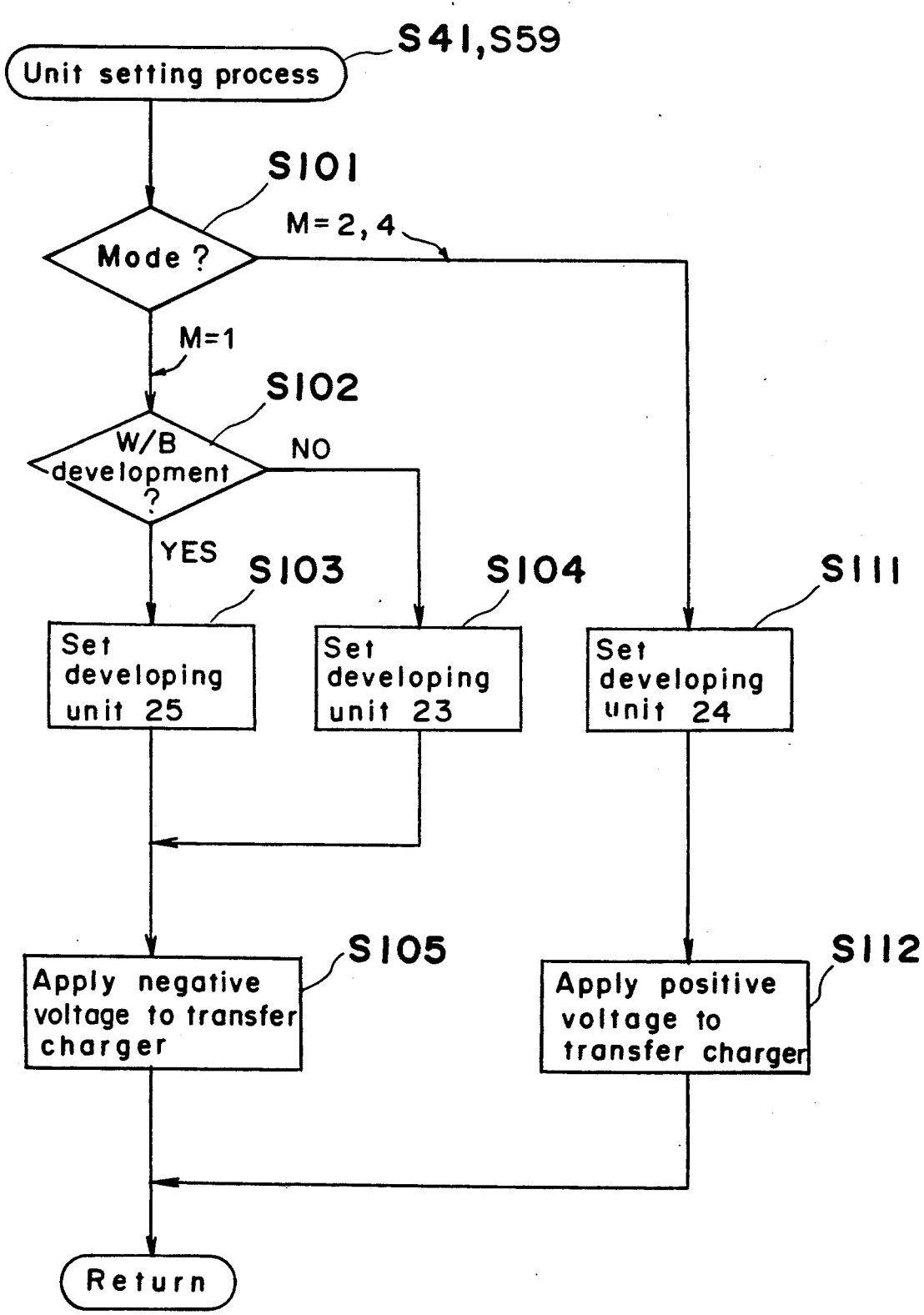
FIG. 14 is a flowchart showing a unit setting process shown in FIG. 13b.

At step S41, there is performed a unit setting process shown in FIG. 14 for setting the units including the developing units 23 to 25 and the transfer charger 26 in a predetermined state corresponding to the operation conditions which have been set in the condition setting process of step S31. Thereafter, the unit check process is performed at step S42, and then, it is judged whether or not the units are operable in a normal state at step S43. If the units are operable in a normal state (Yes at step S43), the program flow goes to step S45, and then, the unit starting process is performed. Otherwise, an error message is displayed on the operation panel 106 at step S44, and then, the program flow goes back to steps S11, S21 and S31, and the warm-up process, the mode selection process and the condition setting process are performed in parallel as described above.

After performing the unit starting process for starting respective units at step S45, the program flow goes to step S46 shown in FIG. 13c, and then, the selected operation mode or the mode selection flag M is checked. Thereafter, the program flow goes to either S50, S61, S71 or S81, when the mode selection flag M=1 to 4, respectively.

In the analogue copying mode (M=1), first of all, it is judged at, step S50 whether or not toner is contained in the selected developing unit 23 or 25 at step S50. When the toner is contained in the selected developing unit (Yes at step S50), the program flow goes to step S51. At step S51, the illumination lamp 4 is controlled, the photoconductor drum 21 is rotated, the electrophotographic process system is controlled, the transportation system is driven, and the fixing section is controlled, as described above. Thereafter, the paper feeding operation is controlled at step S52, and then, the pivotable reflection error 14 is rotated so as to located at the position P1, and the optical system is scanned at step S53. Thereafter, a register roller control process shown in FIG. 15 for controlling the operation of the register roller 37 is performed at step S54, and then, the optical system returns at step S55.

Thereafter, it is judged whether or not these units have been operated in a normal state at step S56. When these units have been operated in a normal state (Yes at step S56), the program flow goes to step S57. Otherwise (No at step S56), an error message is displayed on the operation panel 106 at step S44, and then, the program flow goes to step S11, S21 and S31.

At step S57, it is judged whether or not the process of the analogue copying mode is completed. When the process of the analogue copying mode is completed (Yes at step S57), the program flow goes to step S11, S21 and S31. Otherwise (No at step S57), the processes from steps S52 to S56 are repeated.

On the other hand, when it is judged that there is contained no toner in the selected developing unit (No at step S50), the normal developing operation in the analogue copying operation can not be performed. However, the electrophotographic copying machine 1 of the present preferred embodiment can execute the digital copying operation. Therefore, when the analogue copying operation can not be performed due to trouble caused in the electrophotographic copying machine 1, the operation mode is altered to the digital copying mode without stopping the operation of the electrophotographic copying machine 1, namely, the mode selection flag M is set at four at step S58. Thereafter, the unit setting process shown in FIG. 14 for setting the units in the digital copying mode is performed at step S59, and then, the electrophotographic copying machine 1 is set in such a state that the copying machine 1 can execute the process of the digital copying mode. Namely, the pivotable reflection mirror 14 is rotated so as to located at the position P2 and to be apart from the optical path, and a document image is read by the image sensor 61. Also, the document image is written on the photoconductive layer 21a by the LED head 71, and an electrostatic latent image formed on the photoconductive layer 21a is developed in a reverse developing mode by the developing unit 24. Thus, since the digital copying operation can be performed without stopping the operation of the copying machine 1 even though the normal developing operation can not be performed, a system down of the copying machine 1 can be avoided. Particularly, in the case that the color of the toner contained in the developing unit selected in one operation mode is the same as the color of the toner contained in the developing unit selected in another operation mode even though the operation mode is switched over from one operation mode to another operation mode, the copying operation may be performed continuously, resulting in that the copying machine 1 can be used efficiently.

In the present preferred embodiment, as described above, when no toner is contained int eh selected developing unit (No at step S50), the operation mode is switched over from the analogue copying mode to the digital copying mode at step S58. However, when there no toner is contained in the selected developing unit (No at step S50), it may be indicated on the operation panel 106 that the toner is empty so as to warn of this state to the operator, and then, the operator may select whether or not the operation mode is switched over.

Furthermore, in the case that the normal developing operation can not performed due to other trouble besides the toner being empty, the operation mode may be switched over from the analogue copying mode to the digital copying mode.

In the image read mode (M=2), the communication with an external unit such as a host computer is performed at step S61, and after a signal representing start of reading an image is received therefrom, the illumination lamp 4 is controlled at step S62, and then, the image read circuit is initialized at step S63. Thereafter, at step S64, the pivotable reflection mirror 14 is rotated so as to be outside the optical path, and a document set on the document table 2 is scanned by the scan optical system. Then, the image read process is performed by the CCD image sensor 61, the image process is performed, and the processed image data are outputted to the external unit at step S65. After these processes including the image read process are completed, an end signal is outputted to the external unit at step S66, and then, the illumination unit 3 and the mirror unit 6 of the scan optical system returns the predetermined home position at step S67.

Thereafter, it is judged whether or not the process of the image read mode is completed in a normal state at step S68. When the process of the image read mode is completed in a normal state (Yes at step S68), the program flow goes back to step S11, S21 and S31. Otherwise (No at step S68), an error message is displayed on the operation panel 106 at step S44, and then, the program flow goes back to step S11, S21 and S31.

Figure 13D:
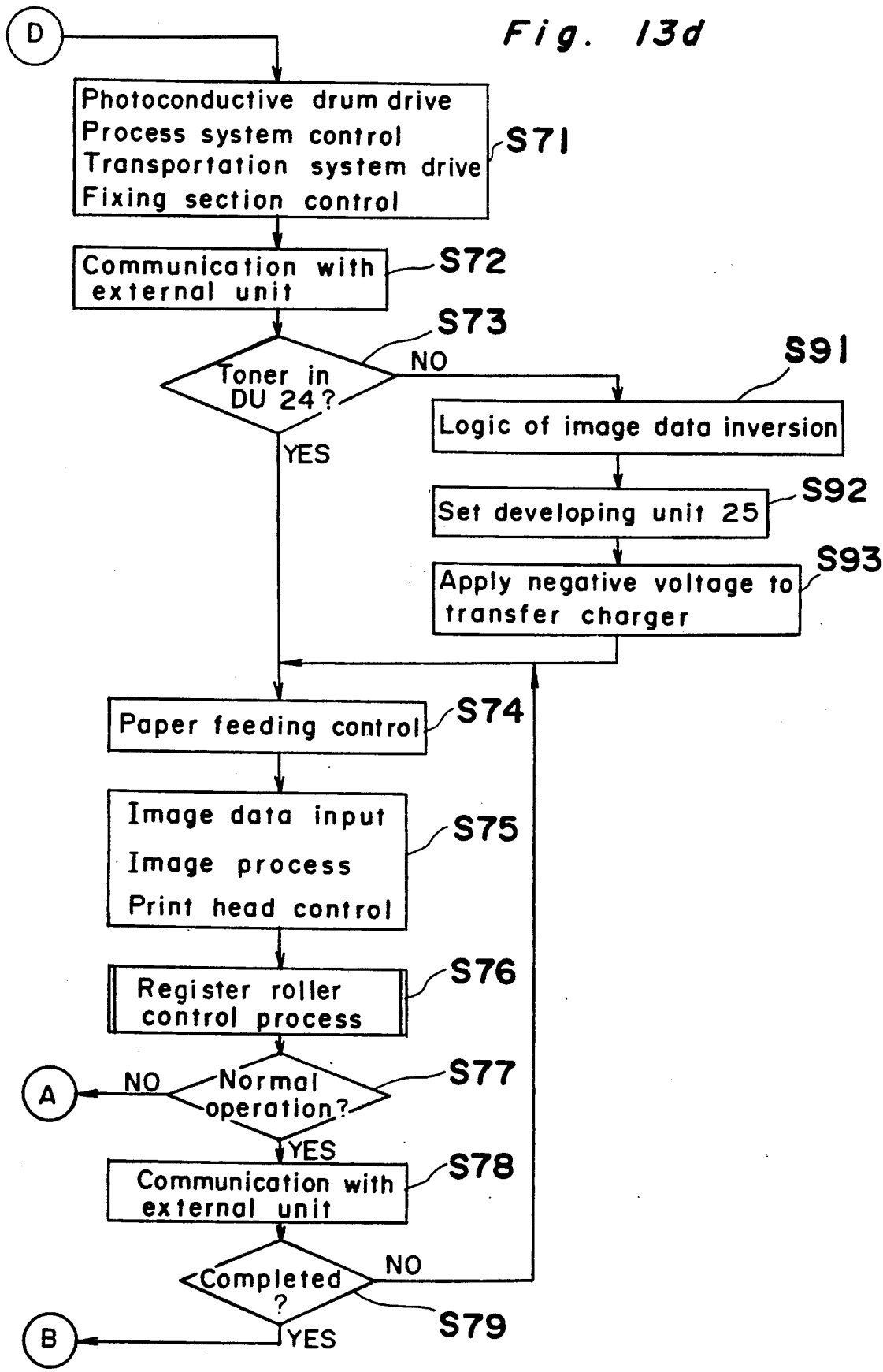

In the image write mode (M=3), as shown in FIG. 13d, the photoconductive drum 21 is rotated, the electrophotographic process system is controlled, the transportation system is driven, and the fixing section is controlled at step S71. Thereafter, the communication with an external unit such as a host computer is performed at step S72.

After a signal representing start of the image write process is received from the external unit, it is judged whether or not there is contained the toner in the developing unit 24 at step S73. When it is judged that there is contained the toner therein (Yes at step S73), the reverse developing operation can be performed. Therefore, the paper feeding operation is controlled at step S74, and then, the program flow goes to step S75. At step S75, an input process for inputting digital image data sent from the external unit is performed, the process for processing the received image data is performed, and the LED head 71 is controlled. Thereafter, a register roller control process shown in FIG. 16 for controlling the register roller 37 is performed at step S76.

Thereafter, it is judged whether or not the process of the image write mode has been performed in a normal state at step S77. When the process of the image write mode has been performed in a normal state (Yes at step S77), the program flow goes to step S78. Otherwise (No at step S77), an error message is displayed on the operation panel 106 at step S44, and then, the program flow goes back to step S11, S21 and S31.

After the communication with the external unit is performed at step S78, it is judged whether or not the process of the image write mode is completed at step S79. When the process of the image write mode is completed (Yes at step S79), the program flow goes back to step S11, S21 and S31. Otherwise (No at step S79), the program flow goes back to step S74, and then, the of step S74 to step S78 is repeated.

On the other hand, when it is judged that the toner to be contained in the developing unit 24 becomes empty (No at step S73), the process of step S91 to S93 is performed as follows without stopping the operation of the electrophotographic copying machine 1. Namely, since the normal developing operation can be also performed in the electrophotographic copying machine 1, the image write process is performed in the normal developing operation as follows. In order to switch over the developing operation from the reverse developing operation to the normal developing operation, the logic of the image data is inverted at step S91, and the developing unit 25 for performing the normal developing operation is set in a operable state at step S92, and then, a negative voltage is applied to the transfer charger 26 at steps 93. Thereafter, the program flow goes to step. S74. Thus, in the case that there is no toner contained in the developing unit 24 and reverse developing operation can not be performed, the developing operation mode is switched over to the normal developing operation, and then, the program flow goes to step S74, and the aforementioned image write process is performed, resulting in that a system down of the copying machine 1 is avoided.

In the digital copying mode (M=4), first of all, the illumination lamp 4 is controlled, the photoconductive drum 21 is rotated, the electrophotographic process section is controlled, the transportation system is driven, and the fixing section is controlled at step S81.

Thereafter, it is judged whether or not there is contained the toner in the developing unit 24 at step S82. When it is judged that the toner is contained therein (Yes at step S82), the reverse developing operation can be performed. Therefore, the paper feeding operation is controlled at step S83, and then, the pivotable reflection mirror 14 is rotated to be located at the position P2 and to be outside the optical path, and the optical system is scanned at step S84. Thereafter, a document image is read by the CCD image sensor 61, and the process for processing the read image data is performed, and the LED head 71 is controlled to write the image of the processed image data at step S85. Then, the register roller control process shown in FIG. 16 for controlling the register roller 37 so as to feed a sheet of copying paper is performed at step S86.

When the scan operation for scanning the document is completed, the illumination unit 3 and the mirror unit 6 of the scan optical system return at step S87. Thereafter, it is judged whether or not the process of the digital copying mode has been executed in a normal state at step S88. When the process of the digital copying mode has been executed in a normal state (Yes at step S88), the program flow goes to step S89. Otherwise (No at step S88), an error message is displayed on the operation panel 106 at step S44, and then, the program flow goes back to step S11, S21 and S31.

At step S89, it is judged whether or not the process of the digital copying mode is completed. When the process of the digital copying mode is completed (Yes at step S89), the program flow goes back to step S11, S21 and S31. Otherwise (No at step S89), the program flow goes to step S83 in order to execute the next digital copying operation.

On the other hand, when it is judged that there is no toner contained in the developing unit 24 empty (No at step S82), the process of steps S96 to S98 is performed as follows without stopping the operation of the electrophotographic copying machine 1. Namely, since the normal developing operation can be also performed in the electrophotographic copying machine 1, the image write process is performed in the normal developing operation as follows. In order to switch over the developing operation from the reverse developing operation to the normal developing operation, the logic of the image data is inverted at step S96, and the developing unit 25 for performing the normal developing operation is set in a operable state at step S97, and then, a negative voltage is applied to the transfer charger 26 at step 98. Thereafter, the program flow goes to step S83. Thus, in the case that there is no toner contained in the developing unit 24 and the reverse developing operation can not be performed, the developing operation mode is switched over to the normal developing operation, and then, the program flow goes to step S83, and the aforementioned image write process is performed, resulting in that a system down of the copying machine 1 is avoided.

Also, in the case that the reverse developing operation, can not be performed due to other trouble besides toner being empty, the developing operation may be switched over from the reverse developing mode to the normal developing mode. Furthermore, in this case, after information of the toner empty may be displayed on the operation panel 106, the operator may select whether or not the developing mode is switched over.

FIG. 14 is a flowchart of the unit setting process (steps S41 and S59) shown in FIGS. 13b and 13c for setting the developing units 23 to 25 and the transfer charger 26 in the predetermined operable state.

Referring to FIG. 14, first of all, the mode selection flag M is checked at step S101. When the analogue copying mode has been selected (M=1), either the developing unit 23 or 25 is set in a operable state at step S103 or S104, respectively. Namely, it is judged whether or not the white/black developing operation is to be performed at step S102. In the case of the white/black developing operation, the developing unit 25 containing the black color toner is set in an operable state at step S103, and then, the program flow goes to step S105. In the case of the color copying operation (No at step S102), the developing unit 23 containing the red color toner is set in an operable state, and then, the program flow goes to step S105. At step S105, a negative voltage is applied to the transfer charger 26 at step S105, and then, the program flow returns to the main routine.

On the other hand, when either the image read mode or the digital copying mode has been selected (M=2 or 4), the reverse developing operation is performed. Namely, the developing unit 24 for performing the reverse developing operation is set in a operable state at step S111, and then, a positive voltage is applied to the transfer charger 26 at step S112. Thereafter, the program flow returns to the main routine.

Figure 15:
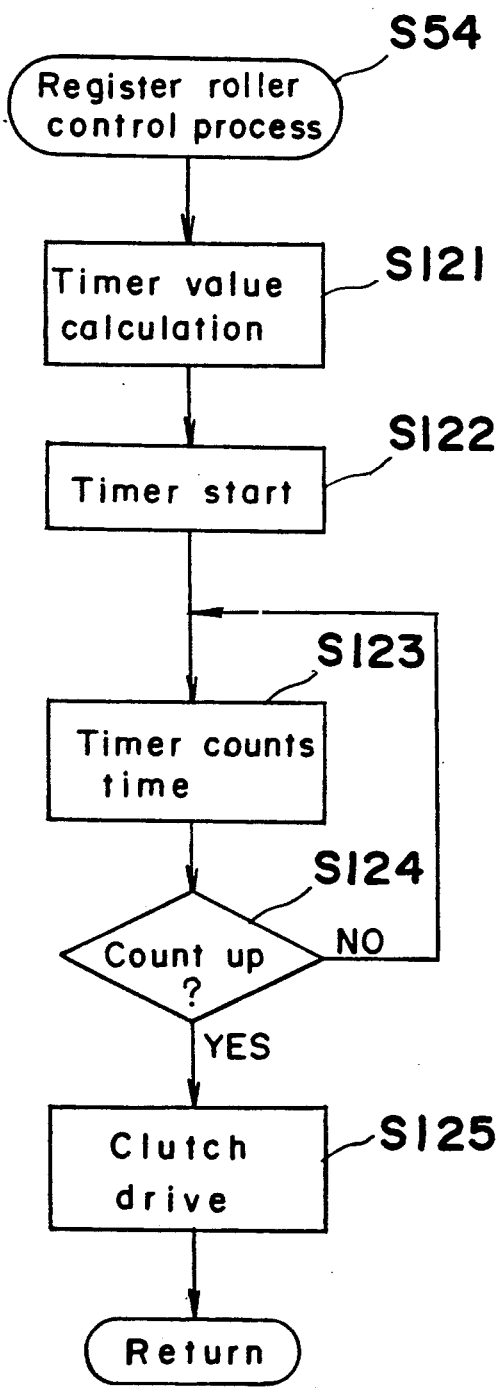
FIG. 15 is a flowchart showing a resist roller control process shown in FIG. 13c which is executed in the analogue copying mode.

FIG. 15 is flowchart of the register roller control process (step S54) in the analogue copying mode shown in FIG. 13c.

Referring to FIG. 15, first of all, the timer value for driving the magnetic clutch 38 is calculated as described above referring to FIG. 10 at step S121, the timer is set at the calculated timer value, and the timer is started to count the time at step S122. Thereafter, when the timer has counted up to the timer value (Yes at step S123), the magnetic clutch 38 is driven at step S125 so as to transport a sheet of copying paper to the transfer section. Then, the program flow returns the main routine.

Figure 13E:
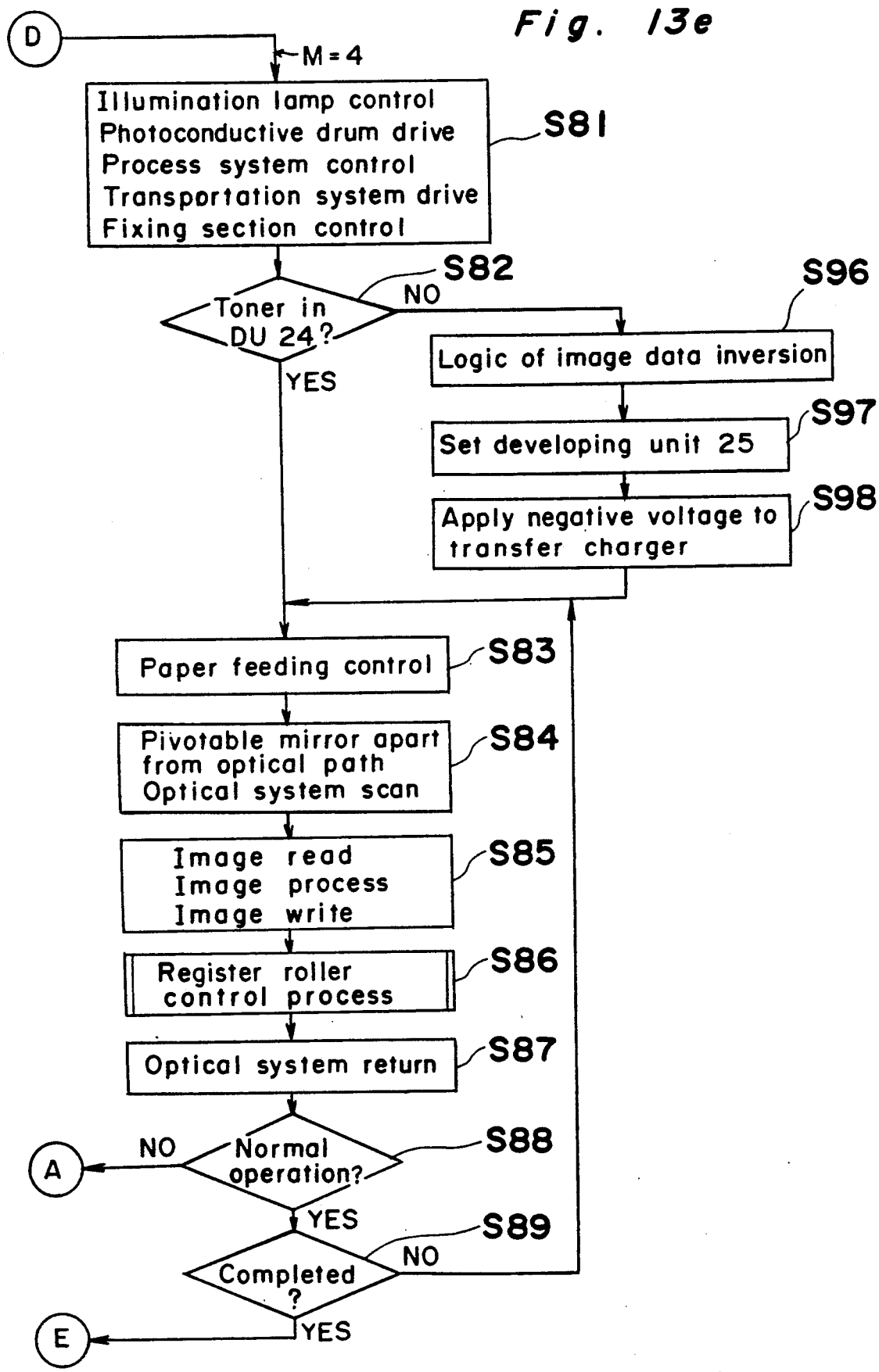
Figure 16:
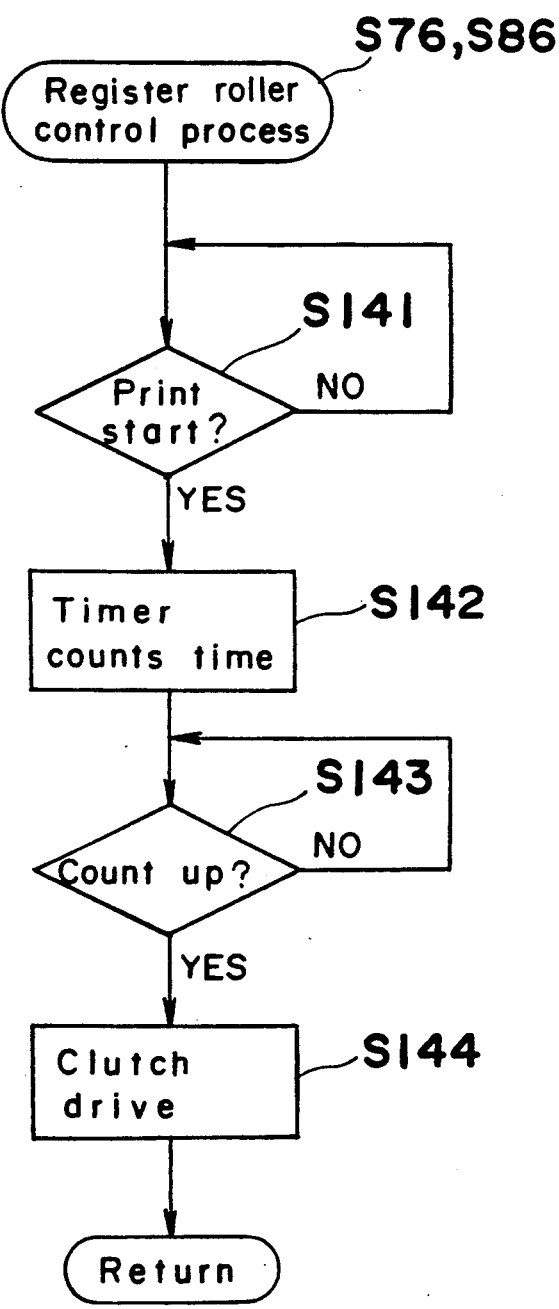
FIG. 16 is a flowchart showing a resist roller control process shown in FIGS. 13d and 13e which are executed in an image write mode and a digital copying mode.

FIG. 16 is a flowchart of the register roller control process (steps 76 and S86) in the digital copying mode and the image write mode shown in FIGS. 13d and 13e.

Referring to FIG. 16, first of all, the program flow waits for a print start signal at step S141. When the print start signal is received (Yes at step S141), the timer is set at the timer value calculated as described referring to FIG. 10, and the timer is started to count the time at step S142. Thereafter, when the timer has counted up to the timer value (Yes at step S143), the magnetic clutch 38 is driven at step S144 so as to transport a sheet of copying paper to the transfer section. Then, the program flow returns the main routine.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

TABLE 1

| Operation conditions | M = 1 | M = 2 | M = 3 | M = 4 |
|---|---|---|---|---|
| Paper feeding cassettes (size of paper) | O | — | O | O |
| Number of prints | O | — | O | O |
| Magnification upon reading or copying | O | O | — | O |
| Exposure level | O | O | — | O |
| Developing unit | O | — | O | O |
| One side/Both sides/Composite copy | O | — | O | O |
| Image processing conditions | — | O | O | O |
| Data transmission rate | — | O | O | — |
| Resolution upon reading | — | O | — | O |
| Trimming | O | O | — | O |
| Masking | O | O | O | O |
| Overlay | — | O | O | O |

What is claimed is:

1. An image processing apparatus comprising:
photoelectric conversion means for reading an image of a document set on a document table and for outputting electric signals corresponding to the image of the document;
a photoconductor;
first latent image formation means for forming an electrostatic latent image corresponding to an image of a document set on said document table onto said photoconductor by projecting light reflected from the document on said photoconductor so as to form the image of the document thereon;
second latent image formation means for forming an electrostatic latent image on said photoconductor by projecting light on said photoconductor responsive to electric signals outputted from said photoelectric conversion means so as to form dot images thereon;
first developing means for developing the electrostatic latent image formed on said photoconductor so as to form a toner image thereon by making toner adhere to unexposed portions of said photoconductor;
second developing means for developing the electrostatic latent image formed on said photoconductor so as to form a toner image thereon by making toner adhere to exposed portions of said photoconductor;
transfer means for transferring the toner image formed on said photoconductor onto paper a polarity of a voltage to be applied to said transfer means adapted to be switched between a positive and negative voltage; and
control means for enabling said first developing means to operate and applying a voltage of a polarity corresponding to the enabled first developing means to said transfer means when an electrostatic latent image is formed on said photoconductor by said first latent image formation means, and for enabling said second developing means to operate and applying a voltage of a polarity corresponding to the enabled second developing means to said transfer means when an electrostatic latent image is formed on said photoconductor by said second latent image formation means.

2. The image processing apparatus as claimed in claim 1, further comprising:
first detection means for detecting whether or not said first developing means can operate;
wherein said control means inhibits the operation of said first latent image formation means and enables said second latent image formation means to operate when said first detection means detects that said first developing means can not operate.

3. The image processing apparatus as claimed in claim 2, wherein said first detection means detects whether or not said first developing means can operate by detecting whether or not toner is contained in said first developing means.

4. An image processing apparatus comprising:
an image sensor for reading an image of a document set on a document table and for outputting electric signals corresponding to the image of the document;
a photoconductor;
optical means for selectively forming an image reflected from a document set on said document table onto either of said photoconductor or said image sensor;
an exposure head for forming dot images on said photoconductor responsive to the electric signals outputted from said image sensor;
first developing means for developing the electrostatic latent image formed on said photoconductor so as to form a toner image thereon by making toner adhere to unexposed portions of said photoconductor;
second developing means for developing the electrostatic latent image formed on said photoconductor so as to form a toner image thereon by making toner adhere to exposed portions of said photoconductor;
transfer means for transferring the toner image formed on said photoconductor onto paper a polarity of a voltage to be applied to said transfer means adapted to be switched between a positive and negative voltage depending on which of said first or second developing means is used;
mode selection means for selecting one copying mode among plural copying modes and for outputting a mode selection signal representing the selected at least one operation mode,
the copying modes including: a first copying mode for enabling said optical means to form an image reflected from a document set on said document table onto said photoconductor so as to form an electrostatic latent image thereon, enabling said first developing means to develop the electrostatic latent image so as to form a toner image thereon, and enabling said transfer means to transfer the toner image onto paper, and a second copying mode for enabling said exposure head to form dot images on said photoconductor so as to form an electrostatic latent image thereon, enabling said second developing means to develop the electrostatic latent image so as to form a toner image thereon, and enabling said transfer means to transfer the toner image onto paper; and
control means for executing the process of the selected copying mode responsive to the mode selection signal.

5. The image processing apparatus as claimed in claim 4, further comprising:

first detection means for detecting whether or not said first developing means can operate;

wherein said control means voids the selection of the first copying mode and executes the process of the second copying mode when the first copying mode is selected by said mode selection means and said first detection means detects that said first developing means can not operate.

6. The image processing apparatus as claimed in claim 5, wherein said first detection means detects whether or not said first developing means can operate by detecting whether or not toner is contained in said first developing means.

7. The image processing apparatus as claimed in claim 4, further comprising:

second detection means for detecting whether or not said second developing means can operate; and inversion means for inverting the electric signals outputted from said image sensor;

wherein said control means enables said inversion means to invert the electric signals outputted from said image sensor so as to output the inverted electric signals to said exposure head, enables said exposure head to form dot images on said photoconductor responsive to the electric signals so as to form an electrostatic latent image thereon, enables said first developing means to develop the electrostatic latent image so as to form a toner image thereon, and enables said transfer means to transfer the toner image onto paper.

8. The image processing apparatus as claimed in claim 7, wherein said second detection means detects whether or not said second developing means can operate by detecting whether or not toner is contained in said second developing means.

9. The image processing apparatus as claimed in claim 4, further comprising:

optical path switching means for switching over the optical path of light reflected from the document so as to selectively project the light reflected from the document onto either of said photoconductor and said image sensor, said optical path switching means being arranged at a position so that a distance between said optical path switching means and said photoconductor is substantially the same as that between said optical path switching means and said image sensor.

10. The image processing apparatus as claimed in claim 9, wherein said optical path switching means is a pivotable reflection mirror.

11. The image processing apparatus as claimed in claim 9, wherein said optical path switching means is an optically semitransparent mirror.

12. The image processing apparatus as claimed in claim 9, wherein said optical means comprises:

a first correction means for correcting a spectral sensitivity of said photoconductor equivalently, said first correction means being arranged on the optical path between said optical path switching means and said photoconductor; and a second correction means for correcting a spectral sensitivity of said image sensor equivalently, said second correction means being arranged on the optical path between said optical path switching means and said image sensor.

13. The image processing apparatus as claimed in claim 12, wherein said first and second correction means correct the spectral sensitivities of said photoconductor and said image sensor, respectively, so that respective color reproduction characteristics in the first and second copying modes are substantially the same as each other.

14. The image processing apparatus as claimed in claim 12, wherein said first and second correction means correct the spectral sensitivities of said photoconductor and said image sensor, respectively, so that respective color reproduction characteristics in the first and second copying modes are substantially different from each other.

15. An image processing apparatus comprising:

an image sensor for reading an image of a document set on a document table and for outputting electric signals corresponding to the image of the document;

inversion means for inverting the electric signals outputted from said image sensor;

a photoconductor;

an exposure head for forming dot images on said photoconductor responsive to the electric signals outputted from either of said image sensor and said inversion means;

first developing means for developing the electrostatic latent image formed on said photoconductor so as to form a toner image thereon by making toner adhere to unexposed portions of said photoconductor;

second developing means for developing the electrostatic latent image formed on said photoconductor so as to form a toner image thereon by making toner adhere to exposed portions of said photoconductor;

detection means for detecting whether or not said second developing means can operate; and control means for enabling said exposure head to form dot images on said photoconductor responsive to the electric signals outputted from said image sensor so as to form an electrostatic latent image thereon and enabling said second developing means to develop the electrostatic latent image so as to form a toner image thereon when said detection means detects that said second developing means can operate, ad for enabling said exposure head to form dot images on said photoconductor responsive to the electric signals outputted from said inversion means so as to form an electrostatic latent image thereon and enabling said first developing means to develop the electrostatic latent image so as to form a toner image thereon when said detection means detects that said second developing means can not operate.

16. The image processing apparatus as claimed in claim 15, wherein said detection means detects whether or not said second developing means can operate by detecting whether or not toner is contained in said second developing means.

* * * * *